(12) United States Patent  
Barnett et al.

(10) Patent No.: US 12,372,203 B2
(45) Date of Patent: Jul. 29, 2025

(54) DEVICE, SYSTEM AND METHOD FOR DISPENSING LUBRICANT

(71) Applicant: GB IP HOLDINGS PTY LTD, Birtinya (AU)

(72) Inventors: Stephen Barnett, Miami (AU); Timothy Hall, Meridan Plains (AU); Peter Condoleon, Moorooka (AU)

(73) Assignee: GB IP HOLDINGS PTY LTD (AU)

( * ) Notice: Subject to any disclaimer, the term of this patent is extended or adjusted under 35 U.S.C. 154(b) by 0 days.

(21) Appl. No.: 18/013,394

(22) PCT Filed: Jun. 30, 2021

(86) PCT No.: PCT/AU2021/050701
§ 371 (c)(1),
(2) Date: Dec. 28, 2022

(87) PCT Pub. No.: WO2022/000037
PCT Pub. Date: Jan. 6, 2022

(65) Prior Publication Data
US 2023/0243468 A1 Aug. 3, 2023

(30) Foreign Application Priority Data
Jul. 1, 2020 (AU) .............................. 2020902240

(51) Int. Cl.
*F16N 29/02* (2006.01)
*F16N 3/12* (2006.01)
(Continued)

(52) U.S. Cl.
CPC ............... *F16N 29/02* (2013.01); *F16N 3/12* (2013.01); *G06K 19/0712* (2013.01);
(Continued)

(58) Field of Classification Search
CPC ...... F16N 29/02; F16N 3/12; F16N 2021/005; F16N 2230/02; F16N 2250/04; F16N 2250/40; G06K 19/0712
See application file for complete search history.

(56) References Cited

U.S. PATENT DOCUMENTS 6,125,969 A    10/2000   Graf et al.
6,997,286 B1 *   2/2006   Funck ..................... F16N 29/02
                                                               222/14
(Continued)

FOREIGN PATENT DOCUMENTS

AU      2017346937 A1    2/2019
CN      110848547 A      2/2020
(Continued)

OTHER PUBLICATIONS

The International Search Report and The Written Opinion of the International Searching Authority for PCT/AU2021/05071, Date of Mailing: Oct. 6, 2021, 23 Pages.
(Continued)

*Primary Examiner* — Henry Y Liu
*Assistant Examiner* — Mark K Buse
(74) *Attorney, Agent, or Firm* — Botos Churchill IP Law LLP

(57) ABSTRACT

Described herein is a modular device for dispensing a lubricant. A first coupling end is attachable to a source of lubrication. A second coupling end is attachable to a lubrication receiver. A control module is arranged between the first coupling end and the second coupling end. The control module includes a flow measuring device in fluid communication between the first end coupling and the second end coupling. The control module is configured to enable dispensing of the lubricant.

20 Claims, 33 Drawing Sheets

(51) Int. Cl.
*G06K 19/07* (2006.01)
*F16N 21/00* (2006.01)

(52) U.S. Cl.
CPC .... *F16N 2021/005* (2013.01); *F16N 2230/02* (2013.01); *F16N 2250/04* (2013.01); *F16N 2250/40* (2013.01)

(56) References Cited

U.S. PATENT DOCUMENTS

| | | |
|---|---|---|
| 8,620,479 B2 | 12/2013 | Botha |
| 8,833,607 B2 | 9/2014 | Wegelin et al. |
| 2007/0056983 A1 | 3/2007 | Wells |
| 2010/0243070 A1 | 9/2010 | Algulin et al. |
| 2013/0015019 A1 | 1/2013 | Kuvaja et al. |
| 2016/0169446 A1* | 6/2016 | Peters ............... H04B 5/77 222/23 |
| 2016/0208983 A1* | 7/2016 | Moilanen ............ F16N 13/06 |
| 2019/0040997 A1 | 2/2019 | Kreutzkaemper et al. |
| 2019/0040998 A1* | 2/2019 | Wride ............... F16N 29/04 |
| 2019/0107249 A1* | 4/2019 | Jolic ................ F16N 21/00 |
| 2019/0219225 A1 | 7/2019 | Beason et al. |
| 2019/0257360 A1* | 8/2019 | Meenakshisundaram ............... F16C 33/6625 |
| 2019/0266721 A1* | 8/2019 | Gibson ............... F16N 3/10 |
| 2019/0368657 A1* | 12/2019 | Willems .............. F16N 11/00 |
| 2020/0003363 A1 | 1/2020 | Köppel et al. |
| 2020/0309319 A1 | 10/2020 | Pitcher |
| 2020/0355323 A1 | 11/2020 | Amar et al. |
| 2022/0112981 A1* | 4/2022 | Eisenbacher ......... F16N 13/22 |
| 2023/0142640 A1* | 5/2023 | Duerinckx ........... F16N 29/04 184/105.3 |

FOREIGN PATENT DOCUMENTS

| | | |
|---|---|---|
| CN | 111503501 A | 8/2020 |
| CN | 211694312 U | 10/2020 |
| DE | 102015215302 A1 | 3/2017 |
| EP | 3872385 A1 | 9/2021 |
| JP | 2006112586 A | 4/2006 |
| KR | 102115006 B1 | 5/2020 |
| WO | 2013135742 A1 | 9/2013 |
| WO | 2015020644 A1 | 2/2015 |
| WO | 2021170764 A1 | 9/2021 |
| WO | 2021180485 A1 | 9/2021 |
| WO | 2022000037 A1 | 1/2022 |

OTHER PUBLICATIONS

The Extended European Search Report for European Patent Application No. 21833548.7, May 31, 2024, 12 Pages.
The International Search Report and The Written Opinion of the International Searching Authority for PCT/AU2021/050701, Date of Mailing: Oct. 6, 2021, 23 Pages.
Examination Report for Chilean Application No. 3780-2022, Sep. 12, 2024, 40 Pages.

\* cited by examiner

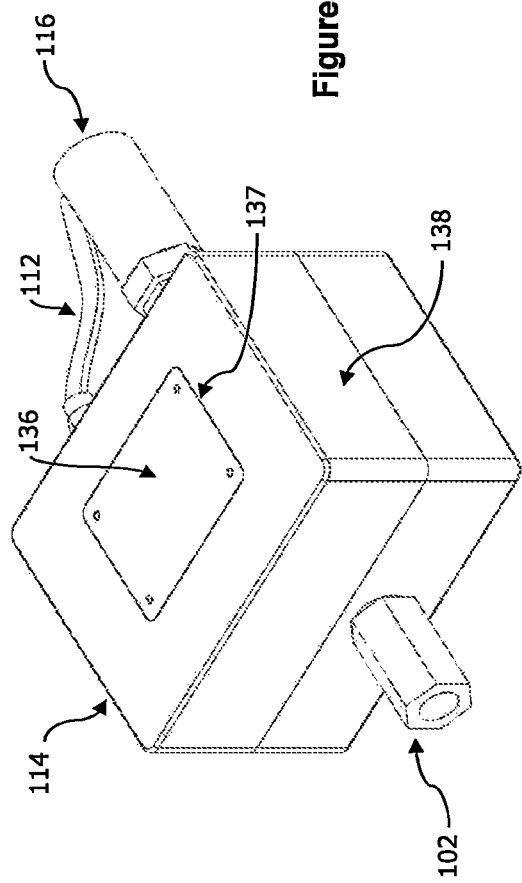
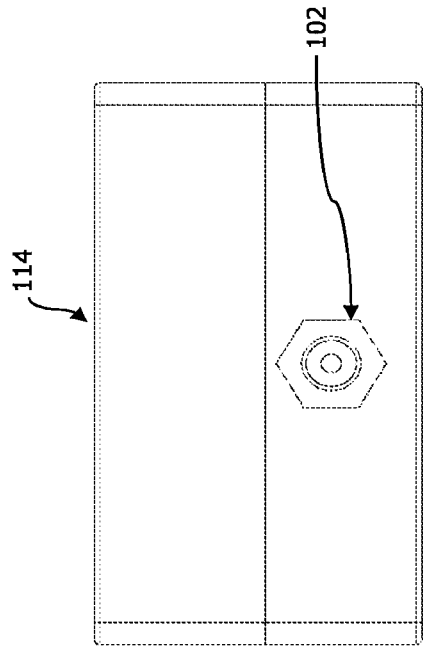
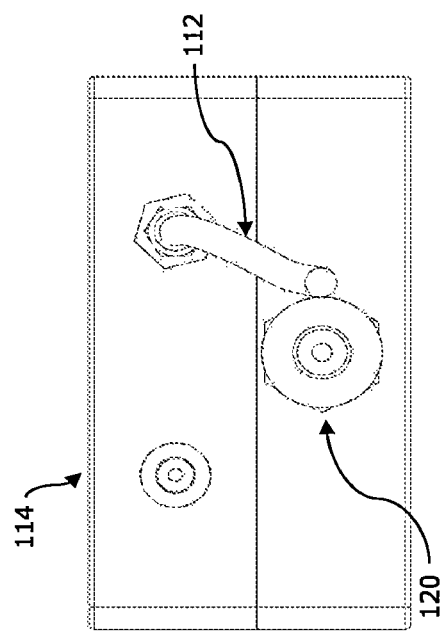
Figure 17A
Figure 17B
Figure 17C

DEVICE, SYSTEM AND METHOD FOR DISPENSING LUBRICANT

TECHNICAL FIELD

This disclosure relates generally to a device system and method for dispensing lubricant to machinery.

BACKGROUND

Machinery and industrial plants require regular lubrication of their moving components to remain operational. If such machines are not appropriately lubricated, it may increase part wear and lead to an increased risk of failure of the machines and reduced life expectancy. As such, it is common to use lubrication dispensing systems, such as manual or electrically or pneumatically powered grease guns to make the task of lubrication easier.

Typically, most lubrication dispensing systems do not measure the volume of the lubricant dispensed. Instead, the volume may be inferred by counting the number of pumps performed by the lubrication dispensing system. For example, where a user pumps grease from a manual grease gun by repeats particularly a lever provided to the gun, where the volume of each pumping action of the lever can vary appreciably. Therefore, current measuring techniques are often inaccurate.

In some cases, electrical powered grease guns may include a motor that articulates a piston that dispenses the grease, wherein the grease gun determines the volume of lubricant dispensed by measuring the current drawn by the motor or torque of the motor and inferring a corresponding dispensed volume of grease from the piston. However, current systems that measure grease in this manner are required to be integrated with the grease gun itself. Such an arrangement is expensive to purchase and maintain. For example, where multiple types of grease may be required to service a single machine or plant, as each grease type would likely require its own gun or be suspected to rigorous and time consuming cleaning processes when swapping grease types.

Further, as the flow is not directly measured, the lubrication may be incorrectly calculated. For example, if blockages, poor nipple connection, premature nipple disengagement or hose leaks occur, the grease gun may incorrectly indicate that the appropriate amount of grease has been dispensed. This is particularly problematic where the grease nipple is located at a visually obscured or hard to reach location within a machine or machinery plant as the operator cannot visually verify the completion of the lubrication task. This may result in insufficient grease being provided to the machine, leading to the issues as discussed above.

Further, the use of powered grease guns is limited in hazardous locations, such as underground coal mines and the like, where such systems inherently carry an increased risk of creating an ignition within the hazardous location. In particular, some environments have explosive atmospheres, due to the presence of explosive gases or fine dust for example. Electrical equipment that is not certified as "intrinsically safe" may cause a spark that ignites explosive gases in such environments. There is strict certification of electrical equipment in such environment, and to date, there are currently no electric grease guns that are certified as intrinsically safe. As such, powered grease guns may not be able to be used in such environments, therefore limiting its use.

Further, as industrial sites may possibly have a large number of machinery, each with its own greasing requirements, the task of greasing can be logistically challenging, particularly if the industrial site encompasses a large area and/or a remote area with limited connectivity to telecommunications. In particular the machinery found on industrial sites can be complex and each machinery may have one or more grease points. In order to apply correct greasing throughout an industrial site, it is desirable to have knowledge, for each grease point, the required grease type, grease volume and grease frequency, all of which can vary greatly when there are many grease points throughout an industrial site. As such, for a person to manually manage these greasing requirements across a large industrial site with many machines, the task would be logistically challenging and likely result in machinery being incorrectly greased.

The logistical challenges posed when greasing machinery throughout an industrial site can be explained as follows. To date, owners and/or managers of such machinery have no reliable method of verifying that the greasing has been completed correctly. Current verification methods involves a person manually completing a (paper) form whilst greasing is being performed. A (paper) form typically is a work order sheet with multiple tick boxes that the person performing the greasing checks off to show which grease points have been greased. In the context of an industrial site, it is possible that there can be hundreds of grease points spread throughout the site, which means the (paper) form will have hundreds of tick boxes that the person performing the greasing has to look through when completing the form. Completing a (paper) form of this nature leaves a lot of room for error as it is relatively easy to make mistakes when completing the form. For example, a check box may be accidentally ticked even though the greasing was never actually applied. This uncertainty around the correct greasing (and/or verification of greasing) of machinery can lead to machinery breakdowns.

The preferred embodiments of the present invention seek to address one or more of these disadvantages.

SUMMARY OF THE DISCLOSURE

In a first aspect, embodiments are disclosed of a modular device for dispensing a lubricant, comprising: a first coupling end attachable to a source of lubrication; a second coupling end attachable to a lubrication receiver; a control module arranged between the first coupling end and the second coupling end, the control module including a flow measuring device in fluid communication between the first end coupling and the second end coupling, wherein the control module is configured to enable dispensing of the lubricant.

In an embodiment, flow measuring device measures the amount of lubrication dispensed.

In an embodiment, the flow measuring device includes a means to measure the pressure of the lubrication dispensed.

In an embodiment, the control module further includes a processing module with at least one source of memory, the processing module arranged in communication with the flow meter, the processing module further arranged in communication with a communication module configured to transmit data between the processing module and a remote computing device.

In an embodiment, the control module further includes a user interface module.

In an embodiment, the user interface module includes a visual display and at least one user input device.

In an embodiment, the control module includes at least one Radio Frequency Identification (RFID) device configured to read RFID tag data from an RFID tag and/or write RFID tag data to an RFID tag.

In an embodiment, the RFID device is or comprises an RFID reader device and/or an RFID writer device.

In an embodiment, the control module further includes a Radio Frequency Identification (RFID) reader device in communication with the processing module.

In an embodiment, the second end coupling includes a RFID antenna arranged in communication with the RFID reader device.

In an embodiment, the RFID antenna is configured to read RFID tag data stored on a RFID tag located at or proximate to the lubrication receiver when the second end coupling is attached or proximate to the location of the lubrication receiver.

In an embodiment, the control module further includes a Radio Frequency Identification (RFID) writer device in communication with the processing module.

In an embodiment, the second end coupling includes a RFID antenna arranged in communication with the RFID writer device.

In an embodiment, the RFID antenna is configured to write RFID tag data stored to a RFID tag located at or proximate to the lubrication receiver when the second end coupling is attached or proximate to the location of the lubrication receiver.

In an embodiment, the RFID tag data includes; a unique identification number assigned to the lubrication receiver.

In an embodiment, the device receives an event schedule relating to a plurality of lubrication receivers from the remote computing device via the communication module and stores the data set on the processing module.

In an embodiment, the processing module compares the RFID tag data to the event schedule to determine whether each of plurality of lubrication receivers requires lubrication.

In an embodiment, for each of the of plurality of lubrication receivers that is determined as requiring lubrication, the processing module uses the measurements from the flow measuring device to determine when the correct lubrication amount has been provided to the lubrication receiver.

In an embodiment, the processing module indicates to the user via the user interface to stop dispensing lubricant when the correct lubrication amount has been provided to the lubrication receiver.

In an embodiment, the processing module stores new event data for each of the plurality of lubrication receivers that has been lubricated.

In an embodiment, the communication module is arranged to transfer new event data to the remote computing device.

In an embodiment, the device is configured to receive an event schedule relating to a lubrication receiver from an RFID tag, preferably by using a RFID (reader) device to scan the RFID tag.

In an embodiment, the device is configured to store the received event schedule on the processing module.

In an embodiment, the device is configured to determine from the received event schedule whether the lubrication receiver is scheduled for greasing.

In an embodiment, the determination is based on a comparison between current time and time the lubrication receiver is scheduled for lubrication according to the received event schedule.

In an embodiment, the device is configured to provide an indication that lubrication should be dispensed to the lubrication receiver corresponding to the scanned RFID tag if the device determines the lubrication receiver is scheduled for lubrication.

In an embodiment, the source of lubrication is a grease gun.

In an embodiment, the source of lubrication is an auto-lubrication device provided to the lubrication receiver.

In an embodiment, the control module includes electrical insulation to minimize the potential to create an ignition while operating in a hazardous location.

In an embodiment, the control module is comprised of materials adapted to reduce likelihood of ignition, preferably preventing ignition.

In an embodiment, the RFID tag is attachable to the lubrication receiver using a fitting in accordance with any embodiment of the eighth aspect.

In a second aspect, embodiments are disclosed of a modular device for dispensing a lubricant, comprising: a first coupling end attachable to a source of lubrication; a second coupling end attachable to a lubrication receiver; a control module arranged between the first coupling end and the second coupling end, the control module including a flow measuring device in fluid communication between the first end coupling and the second end coupling, wherein the control module is configured to monitor dispensing of the lubricant.

In an embodiment, the flow measuring device measures the amount of lubrication dispensed.

In an embodiment, the flow measuring device includes a means to measure the pressure of the lubrication dispensed.

In an embodiment, the control module further includes a processing module with at least one source of memory, the processing module arranged in communication with the flow meter, the processing module further arranged in communication with a communication module configured to transmit data between the processing module and a remote computing device.

In an embodiment, the control module further includes a user interface module.

In an embodiment, the user interface module includes a visual display and at least one user input device.

In an embodiment, the control module includes at least one Radio Frequency Identification (RFID) device configured to read RFID tag data from an RFID tag and/or write RFID tag data to an RFID tag.

In an embodiment, the RFID device is or comprises an RFID reader device and/or an RFID writer device.

In an embodiment, the control module further includes a Radio Frequency Identification (RFID) reader device in communication with the processing module.

In an embodiment, the second end coupling includes a RFID antenna arranged in communication with the RFID reader device.

In an embodiment, the RFID antenna is configured to read RFID tag data stored on a RFID tag located at or proximate to the lubrication receiver when the second end coupling is attached or proximate to the location of the lubrication receiver.

In an embodiment, the control module further includes a Radio Frequency Identification (RFID) writer device in communication with the processing module.

In an embodiment, the second end coupling includes a RFID antenna arranged in communication with the RFID writer device.

In an embodiment, the RFID antenna is configured to write RFID tag data stored to a RFID tag located at or proximate to the lubrication receiver when the second end coupling is attached or proximate to the location of the lubrication receiver.

In an embodiment, the RFID tag data includes; a unique identification number assigned to the lubrication receiver.

In an embodiment, the device receives an event schedule relating to a plurality of lubrication receivers from the remote computing device via the communication module and stores the data set on the processing module.

In an embodiment, the processing module compares the RFID tag data to the event schedule to determine whether each of plurality of lubrication receivers requires lubrication.

In an embodiment, for each of the of plurality of lubrication receivers that is determined as requiring lubrication, the processing module uses the measurements from the flow measuring device to determine when the correct lubrication amount has been provided to the lubrication receiver.

In an embodiment, the processing module indicates to the user via the user interface to stop dispensing lubricant when the correct lubrication amount has been provided to the lubrication receiver.

In an embodiment, the processing module stores new event data for each of the plurality of lubrication receivers that has been lubricated.

In an embodiment, the communication module is arranged to transfer new event data to the remote computing device.

In an embodiment, the device is configured to receive an event schedule relating to a lubrication receiver from an RFID tag, preferably by using a RFID (reader) device to scan the RFID tag.

In an embodiment, the device is configured to store the received event schedule on the processing module.

In an embodiment, the device is configured to determine from the received event schedule whether the lubrication receiver is scheduled for greasing.

In an embodiment, the determination is based on a comparison between current time and time the lubrication receiver is scheduled for lubrication according to the received event schedule.

In an embodiment, the device is configured to provide an indication that lubrication should be dispensed to the lubrication receiver corresponding to the scanned RFID tag if the device determines the lubrication receiver is scheduled for lubrication.

In an embodiment, the source of lubrication is a grease gun.

In an embodiment, the source of lubrication is an auto-lubrication device provided to the lubrication receiver, preferably wherein identification data of the modular device is matched to data relating to the auto-lubrication device.

In an embodiment, the control module includes electrical insulation to minimize the potential to create an ignition while operating in a hazardous location.

In an embodiment, the control module is comprised of materials adapted to reduce likelihood of ignition, preferably preventing ignition.

In an embodiment, the RFID tag is attachable to the lubrication receiver using a fitting in accordance with any embodiment of the eighth aspect.

In a third aspect, embodiments are disclosed of a system for dispensing a lubricant, the system comprising: a modular device for dispensing a lubricant that is attachable between a source of lubrication and a plurality of lubrication receivers; a remote computing device arranged to communicate with the modular device; wherein the remote computing device is arranged to receive event log data relating to completed lubrication tasks in accordance with an event schedule, the remote computing device further arranged to provide an updated event schedule for the next period; wherein the modular device guides a user to lubricate each of the plurality of lubrication receivers in accordance with the updated event schedule.

In a fourth aspect, embodiments are disclosed of a system for dispensing a lubricant, the system comprising: a plurality of modular devices according to any embodiment of the first or second aspect; wherein each modular device is configured to guide a respective user to lubricate one or more lubrication receivers in accordance with an updated event schedule.

In an embodiment, the updated event schedule is provided by configuring the plurality of modular devices to write event data to an RFID tag corresponding to the lubrication receiver, preferably with an RFID writer.

In an embodiment, the event data comprises one or more of:
time of lubrication event
date of lubrication event
volume of lubricant dispensed
identifying information of the source of lubrication, preferably a serial number In an embodiment, the plurality of modular devices are configured to receive an updated event schedule by:
connecting to a remote computing device to retrieve a global event schedule, and/or
scanning an RFID tag corresponding to the lubrication receiver, preferably with an RFID reader, to retrieve event data previously saved to the RFID tag.

In an embodiment, the plurality of modular devices comprise a memory for saving the updated event schedule to.

In a fifth aspect, embodiments are disclosed of a method for dispensing lubricant; comprising: attaching a first coupling end of a modular lubrication dispensing device to a source of lubrication, the device including a control module and a user interface; attaching a second coupling end of the device to at least one lubrication receiver; identifying the at least one lubrication receiver by means of a Radio Frequency Identification (RFID) reading device provided to the second coupling end that reads identification data from a RFID tag device provided to the at least one lubrication receiver; indicating to a user by means of the user interface whether the at least one lubrication receiver requires lubrication, wherein if the at least one lubrication receiver requires lubrication; dispensing lubricant to the at least one lubrication receiver; measuring the flow of lubrication to the at least one lubrication receiver using a flow measuring device arranged between the first coupling end and the second coupling end; alerting a user of the device that the appropriate amount of lubrication has been dispensed.

In an embodiment, the at least one lubrication receiver includes a plurality of lubrication receivers and the aforementioned method steps are performed for each of the plurality of lubrication receivers.

In an embodiment, the device 100 downloads an event schedule for a service period from a remote computing device, wherein the event schedule is displayed to the user using the device and the user lubricates the plurality of lubrication receivers in accordance with the event schedule.

In an embodiment, once the step of alerting a user of the device that the appropriate amount of lubrication has been dispensed to one of the plurality of lubrication receivers, the device alerts the user to the next one of the plurality of lubrication receivers as displayed on the event schedule.

In an embodiment, the device saves new event data associated with each of the plurality of lubrication receivers that are lubricated.

In an embodiment, the method further comprises the step of transmitting the new event data to a remote computing device.

In an embodiment, the method further comprises the step of updating the event schedule in accordance with the new event data.

In an embodiment, the method further comprises the step of the device downloading the updated events schedule for the next service period.

In a sixth aspect, embodiments are disclosed of a method for dispensing lubricant; comprising: attaching a first coupling end of a modular lubrication dispensing device to an auto-lubrication device provided to a machine, the device including a control module; attaching a second coupling end of the device to a lubrication receiver of the machine; measuring the flow of lubrication to the lubrication receiver using a flow measuring device arranged between the first coupling end and the second coupling end; recording the appropriate amount of lubrication has been dispensed by the auto lubrication device; storing data on the measured flow of lubrication to memory included in the control module; and transmitting the stored data to a remote computing device over a network.

In an embodiment, the RFID tag is attachable to the lubrication receiver using a fitting in accordance with any embodiment of the eighth aspect.

In an embodiment, the device further includes a user interface.

In a seventh aspect, embodiments are disclosed of a method for dispensing lubricant; comprising: attaching a first coupling end of a modular lubrication dispensing device to a source of lubrication, the device including: a flow measuring device in fluid communication between the first end coupling and a second coupling end of the device, and a user interface; attaching the second coupling end of the device to a lubrication receiver; identifying the lubrication receiver by means of a Radio Frequency Identification (RFID) reading device provided to the second coupling end that reads identification data from a RFID tag provided to the at least one lubrication receiver; indicating to a user by means of the user interface whether the at least one lubrication receiver requires lubrication; wherein if the lubrication receiver requires lubrication; dispensing lubricant to the lubrication receiver; and measuring the flow of lubrication to the lubrication receiver using the flow measuring device arranged between the first coupling end and the second coupling end.

In an embodiment, the modular dispensing device further comprises a control module.

In an embodiment, the control module includes the flow measuring device and/or the user interface.

In an embodiment, the method further comprises the step of retrieving an event schedule.

In an embodiment, the step of retrieving an event schedule is performed by operating the RFID reading device to scan RFID tag data from an RFID tag corresponding to a lubrication receiver.

In an embodiment, the method further comprises the step of determining whether the at least one lubrication receiver requires lubrication in accordance with an event schedule.

In an embodiment, the step of determining whether the at least one lubrication receiver requires lubrication in accordance with the event schedule is based on a comparison between current time and time the lubrication receiver is scheduled for lubrication according to the received event schedule.

In an embodiment, the method further comprises the step of detaching the second coupling end of the device from the lubrication receiver.

In an embodiment, the RFID tag is attachable to the lubrication receiver using a fitting in accordance with any embodiment of the eighth aspect.

In an embodiment, the method further comprises the step of saving new event data associated with the dispensing of lubricant to the lubrication receiver.

In an embodiment, the method further comprises the step of updating the event schedule in accordance with the new event data.

In an embodiment, the new event data comprises one or more of:
  time of lubrication event
  date of lubrication event
  volume of lubricant dispensed
  identifying information of the source of lubrication, preferably a serial number.

In an embodiment, the step of updating event schedule comprises saving new event data to an RFID tag corresponding to the lubrication receiver, preferably with an RFID writer.

In an embodiment, the step of updating event schedule comprises saving new event data to a memory of the modular dispensing device.

In an embodiment, the method further comprises the step of alerting the user if the volume of lubricant dispensed exceeds the volume prescribed by the event schedule.

In an embodiment, the method further comprises the step of checking if lubricant type used in the source of lubrication matches lubricant type required by the lubrication receiver according to the event schedule.

In an embodiment, the method further comprises the step of alerting the user if lubricant type used in the source of lubrication does not match lubricant type required by the lubrication receiver.

In an embodiment, the method further comprises the step of alerting a user of the device that the appropriate amount of lubrication has been dispensed.

In an embodiment, the event schedule is stored in the RFID tag.

In an embodiment, the method further comprises the step of downloading the event schedule for a service period from a remote computing device prior to identifying the lubrication receiver.

In an embodiment, the method further comprises the step of transmitting new event data to a remote computing device.

In an embodiment, the method further comprises the step of downloading the updated event schedule for the next service period.

In an embodiment, the event schedule is a global event schedule.

In an embodiment, the method further comprises repeating the recited method steps to dispense lubricant to another lubrication receiver.

In an eighth aspect, embodiments are disclosed of a fitting for attaching an RFID tag to a lubrication receiver, the fitting comprising a body adapted to receive an RFID tag, wherein the body is adapted such that the RFID tag attaches to the lubrication receiver by attaching at least a portion of the body to the lubrication receiver.

In an embodiment, the fitting provides an easy option for attaching the RFID tag to the lubrication receiver, preferably an easy snap-fit option.

In an embodiment, the fitting is adapted such that:
the RFID tag is attachable to the lubrication receiver without needing to dismantle the lubrication receiver, and/or
the RFID tag is attachable to the lubrication receiver without use of tools for installation.

In an embodiment, the body has an opening, such that RFID tag attaches to the lubrication receiver when at least a portion of the opening attaches to the lubrication receiver.

In an embodiment, the at least a portion of the opening attaches to the lubrication receiver by clipping.

In an embodiment, the opening is further adapted such that friction between the opening and the lubrication receiver keeps the RFID tag attached to the lubrication receiver.

In an embodiment, the opening comprises one or more notches to enable clipping.

In an embodiment, the one or more notches are located around the edge of the opening.

In an embodiment, in use, the opening fits snugly around the lubrication receiver.

In an embodiment, the opening is substantially circular.

In an embodiment, the body further comprises a holder adapted to receive the RFID tag.

In an embodiment, the holder is a cavity.

In an embodiment, the holder is configured to receive a capsule containing the RFID tag.

In an embodiment, the body is a tab.

In an embodiment, the lubrication receiver is a grease nipple.

In an embodiment, at least the body is thin enough to enable a second coupling end of a modular device in accordance with any embodiment of the first or second aspect to attach to the lubrication receiver.

In an embodiment, the fitting is further adapted to be quickly attachable to the lubrication receiver.

In an embodiment, the fitting is further adapted to be resistant to one or more of:
vibration
chemicals
heat
cold.

Other aspects, features, and advantages will become apparent from the following detailed description when taken in conjunction with the accompanying drawings, which are a part of this disclosure and which illustrate, by way of example, principles of inventions disclosed.

DESCRIPTION OF THE FIGURES

The accompanying drawings facilitate an understanding of the various embodiments.

FIGS. 17A-E are respectively a perspective, front, rear, cross section top, and top view of an embodiment of the invention.

DETAILED DESCRIPTION

Figure 1:
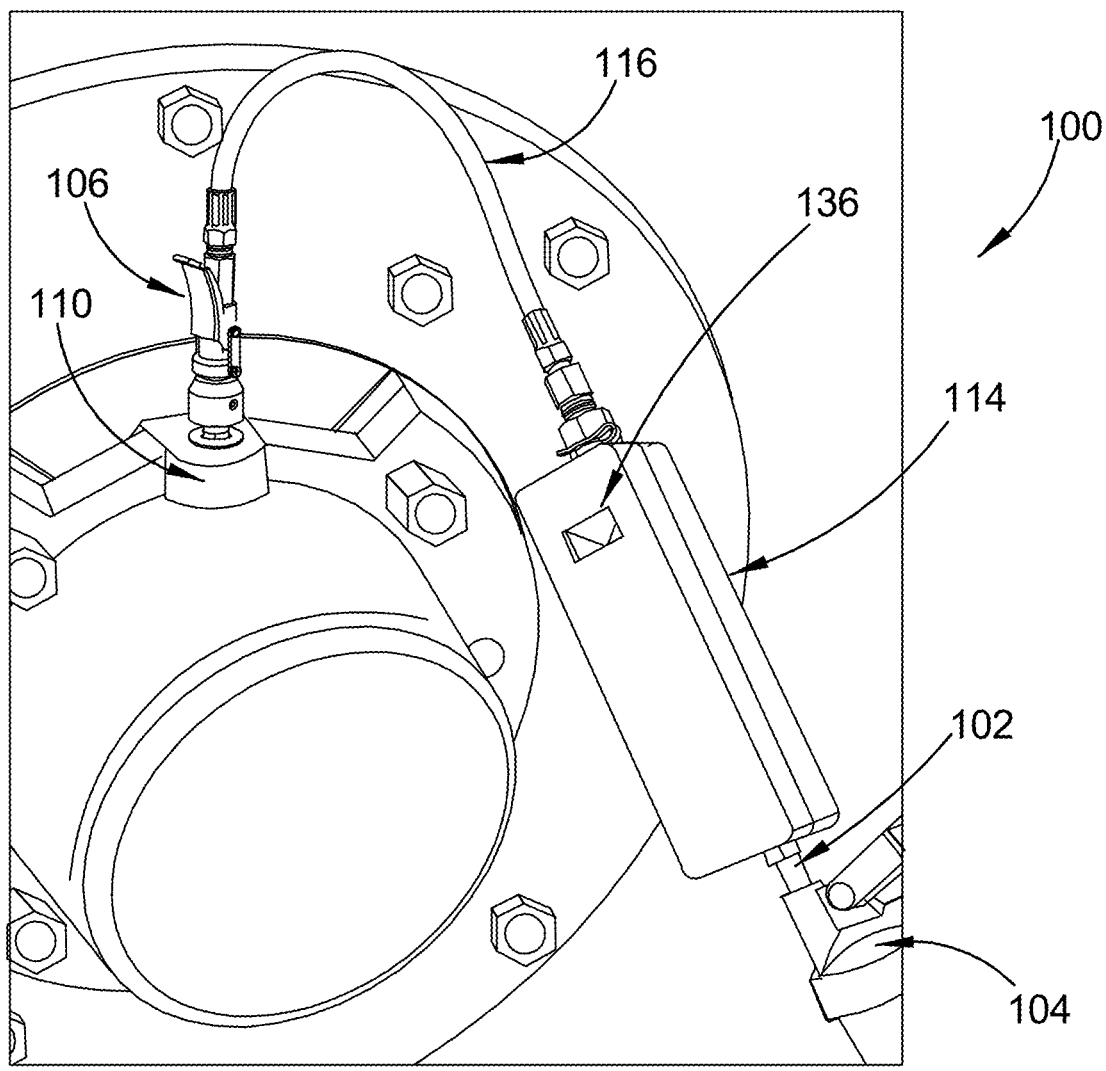
FIG. 1 is a perspective view of an embodiment of the invention.

1. Modular Device 1.1 Overview of Device

Referring generally to the following description and figures, there is illustrated an example of a modular device 100 for dispensing a lubricant. For the avoidance of doubt, the terms "modular device" and "device" are used interchangeably in this specification. The device 100 may comprise a first coupling end 102 attachable to a source of lubrication. The source of lubrication as shown may include a hand operated grease gun 104 or grease pump. For the avoidance of doubt, the terms "source of lubrication", "source of lubricant", "lubrication source", "lubricant source" and "grease source" are interchangeable in this specification. Alternatively, the source of lubrication may also include other sources, such as powered grease guns or auto-lubrication devices or systems. The first coupling end 102 may include an inlet that is sized and shaped to attach to an outlet of the source of lubrication. The device 100 may include a number of embodiments that enable it to be provided to a number of different sources of lubrication.

1.2. Exemplary Embodiments of Device

For example, referring to FIGS. 1 to 6, a first embodiment may be provided for an in-line modular device 100 that is arranged to locate between any type of lubricant receiver and any type of grease source. For example, the first coupling end 102 includes an inlet attachment fixture that is configured to attach to an outlet of a manually operative grease gun 104, which is just one example of a type of grease source that may be used. For example, the inlet attachment fixture may include a threaded fixture that is arranged to connect to a mating thread provided to the outlet of the grease gun 104.

Further, the device 100 may include a second coupling end 106 attachable to a lubrication receiver. An example of the lubrication receiver may include a grease nipple 108, which is arranged to supply lubricant to equipment requiring grease 110. For the avoidance of doubt, the terms "lubrication receiver" and "lubricant receiver" are interchangeable in this specification.

Figure 2:
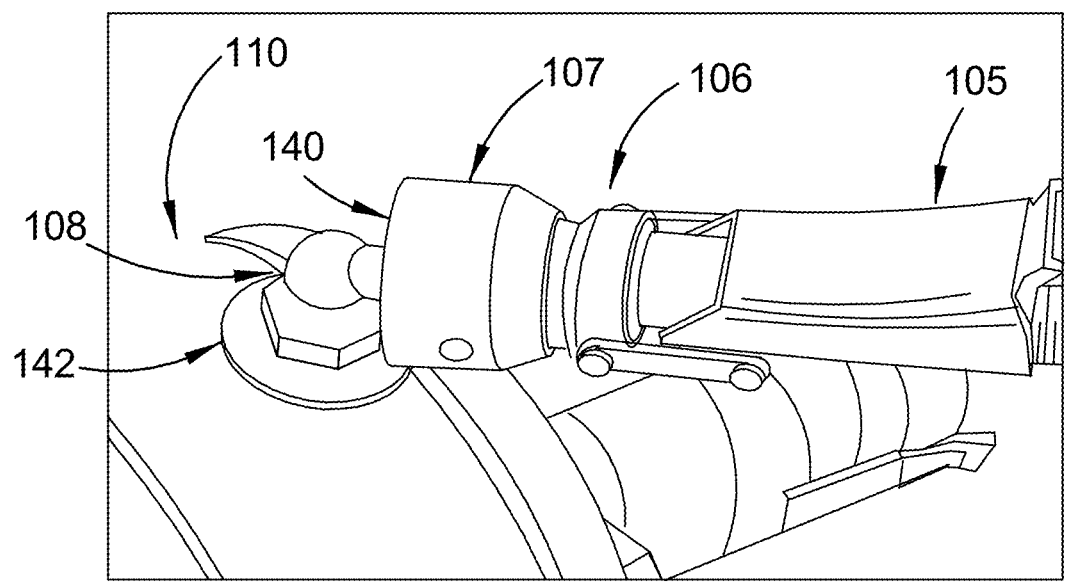
FIG. 2 is a perspective view of an embodiment of the invention.

Referring to FIG. 2, the second coupling end 106 may include a grease nipple coupling 107 that is arranged to attach to the grease nipple 108 by means of movable gripping jaws provided within the coupling. The grease nipple coupling 107 may also include a coupling lever 105 that is arranged to move into an open position that articulates gripping jaws to widen the opening within the grease nipple coupling 107 to receive the grease nipple 108. The coupling lever 105 may also be moved to a closed position that articulates the gripping jaws to narrow the opening within the grease nipple coupling 107 to retain the grease nipple 108 when the dispensing lubrication through the device. The use of the grease nipple coupling 107 provides a greater degree of certainty that the lubricant is delivered into the nipple.

In another embodiment, the coupling lever 105 may be automatically actuated by the device 100. For example, the coupling lever 105 may be actuated based on the proximity and/or connection of the second coupling end 106 to the lubrication receiver. That is, where the grease nipple coupling 107 is placed onto a grease nipple, the device 100 may be configured to detect that arrangement by means of an RFID tag and (reader) device (these features are discussed in further detail below) and automatically move the grease nipple coupling 107 into the closed position. Further, once the device 100 confirms that the correct amount of lubrication has been dispensed, the device 100 may then automatically move the grease nipple coupling 107 into the open position. Additionally, or alternatively, closing of the coupling lever 105 could prompt the RFID (reader) device to start scanning for RFID tags. This ensures that (battery) power is not used for scanning for RFID tags when the device 100 is not coupled to a lubrication point.

Alternatively, the lubrication receiver may also include other inlets or channels for receiving lubricant to enable the operation of machines or processes, such as but not limited to bearings, joints, seals and shafts. Accordingly, the device 100 may be configured to use various different types of lubricant depending on the use and operating conditions. For example, the lubricant may include various compositions of mineral oils, synthetic oils, or bio-lubricants.

The device 100 also includes a control module 114 arranged between the first coupling end 102 and the second coupling end 106, wherein the control module 114 is configured to enable dispensing of the lubricant and/or enable monitoring of the dispensing of lubricant. In an embodiment, the device 100 may include at least one flexible connective portion arranged to connect the first coupling end 102 and the control module 114 and/or to connect the control module 114 and the second coupling end 106. In other words, the device 100 may include the at least one flexible connective portion on either side or both sides of the control module 114.

An example arrangement is provided in FIGS. 3 to 6, where the at least one flexible connective portion includes a hose portion 116 that connects the control module 114 and the second coupling end 106. The at least one flexible connective portion may be made from a resilient and flexible material such as plastic or rubber, for example the hose portion 116 may be made from rubber, plastics, braided steel hosing or a combination of such materials.

The at least one flexible connective portion may (alternatively or additionally) comprise, or be, a power and data cable. The power and data cable could be a coaxial cable for example. The power and data cable may be wound within a coating material of the flexible connective portion during manufacture. Such arrangement simplifies the manufacturing process. The coaxial cable may comprise of material that provides the coaxial cable with high flexibility such that the coaxial cable can withstand a large number of bend cycles (e.g. at least a million bend cycles or more) before breaking. The coaxial cable may be incorporated into the hose portion 116, or may be separate to the hose portion 116. There may be a (cut and crush proof) sheath covering that is provided to protect the coaxial cable and the hose portion 116.

Figure 3:
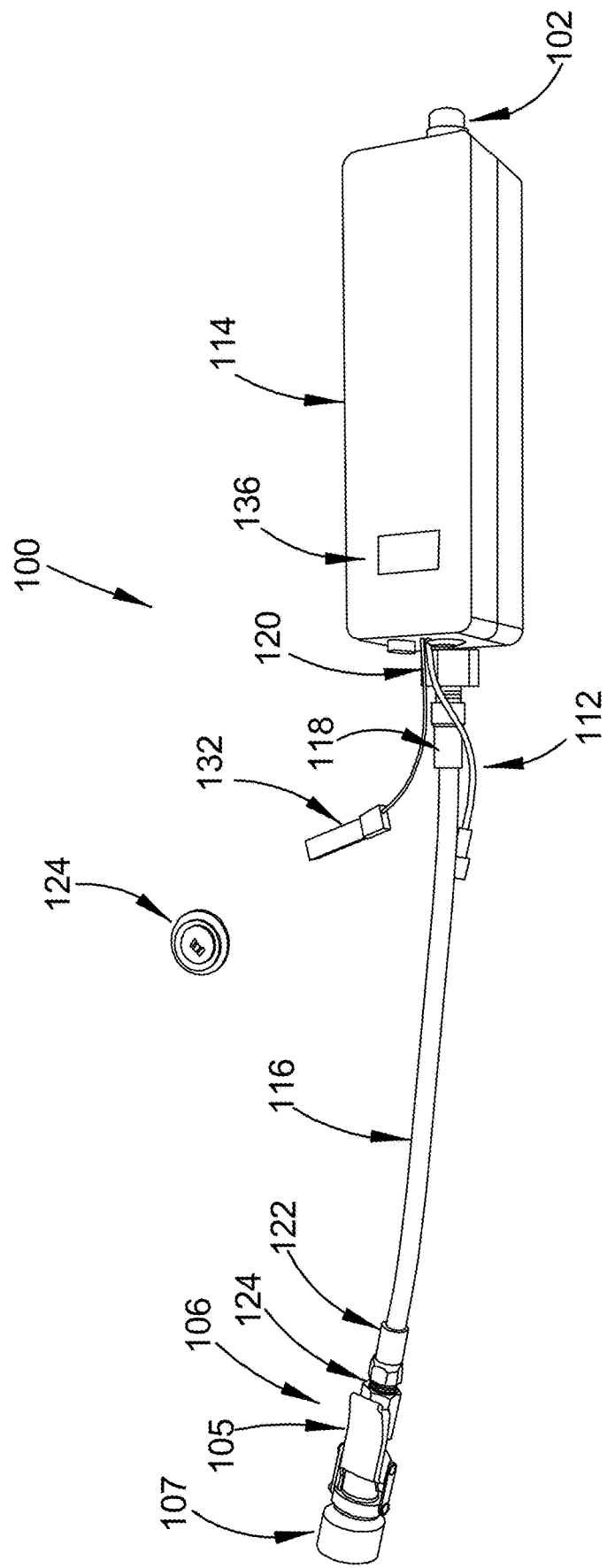
FIG. 3 is a perspective view of an embodiment of the invention.

The hose portion 116 may include a first end fitting 118 configured to connect to a control module fitting 120 provided to the control module 114. Further, the hose portion 116 may also include a second end fitting 122 configured to connect to an end coupling fitting 124 provided to the second coupling end 106. Each of the first end fitting 118, control module fitting 120, second end fitting 122, or end coupling fitting 124 may include the same or different fitting types. For example, as shown in FIG. 3, all fittings 118, 120, 122, 124 include a threaded type fitting.

Alternatively, any one or more of the fittings 118, 120, 122, 124 may include a compression fitting, flare fitting, barbed fitting, clamp fitting, gasket fitting, quick connect fitting, claw clamp fitting or other such type of hose or pipe fitting or connective device. Further, the above fittings may also be provided for an embodiment where the at least one flexible connective portion is arranged to connect the first coupling end 102 and the control module 114 (not shown).

Figure 16A:
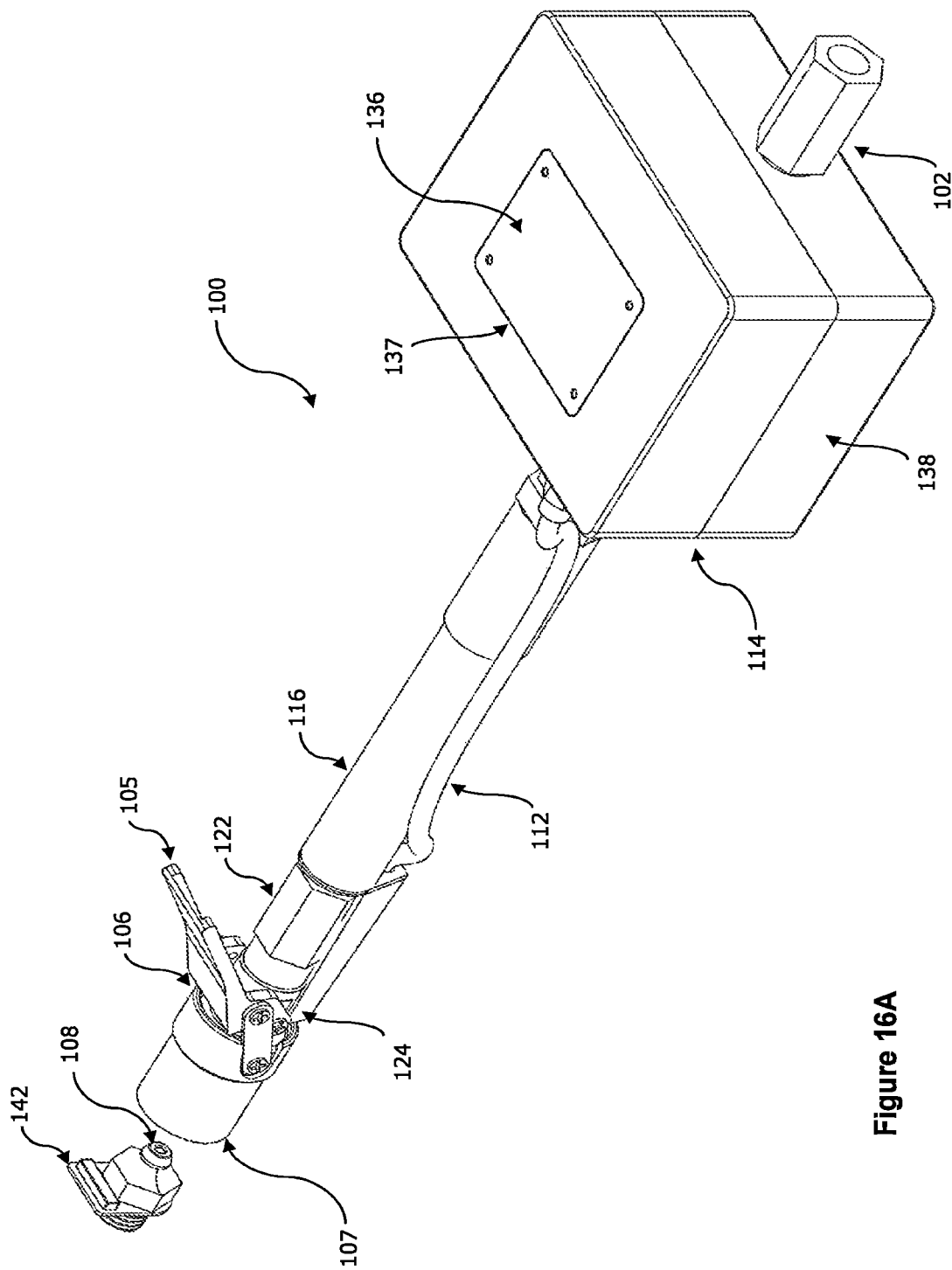
FIGS. 16A and B are respectively a perspective and side view of an embodiment of the invention.
Figure 16B:
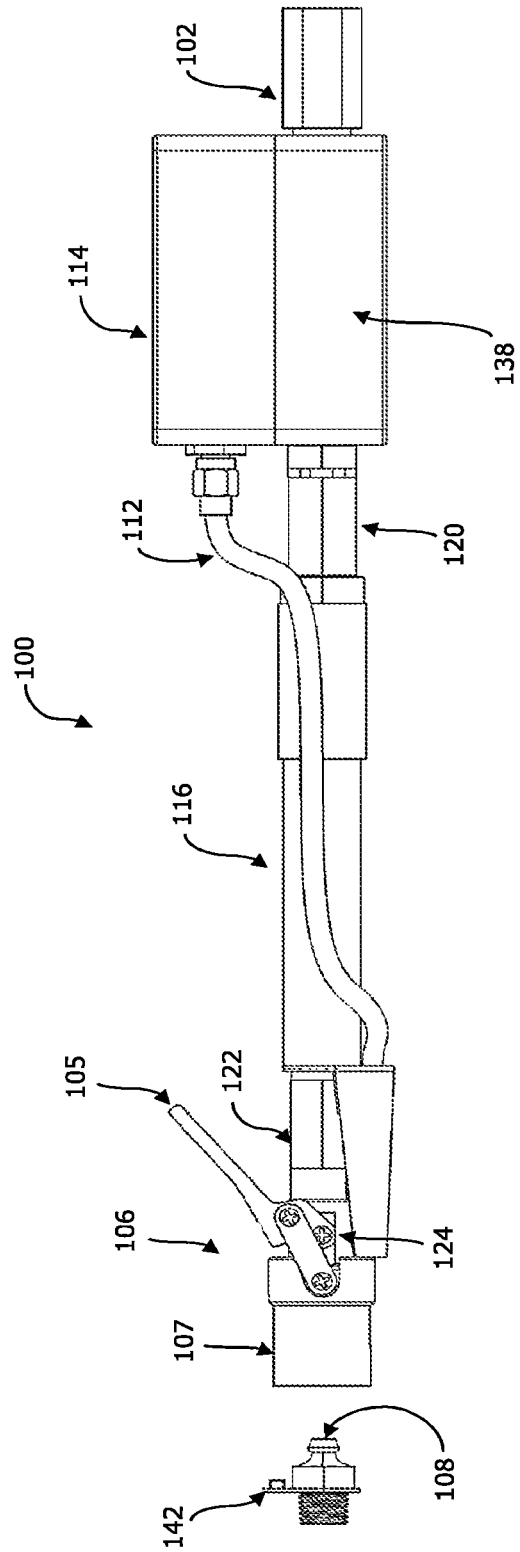
Figure 17E:
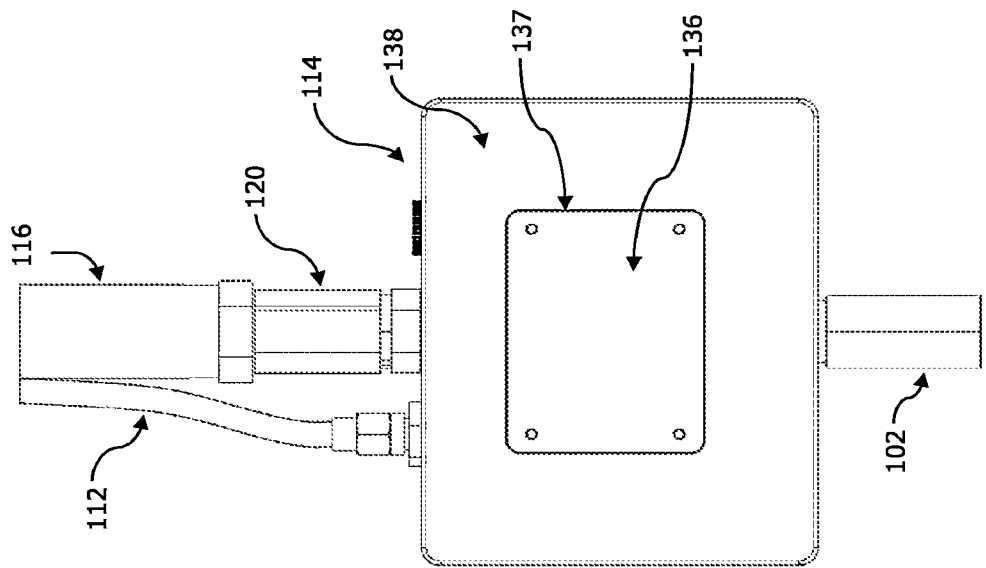
Figure 17D:
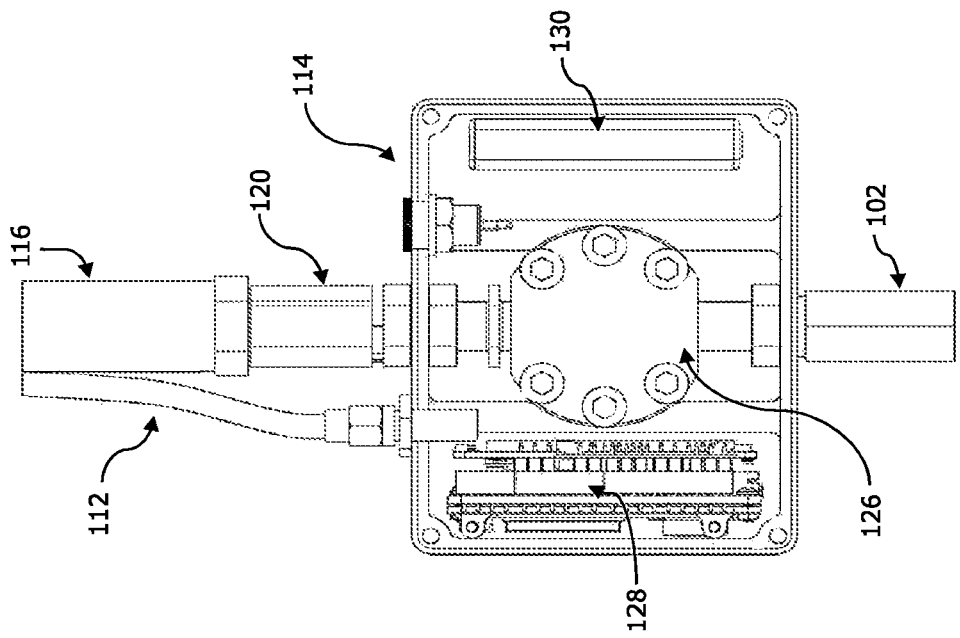

Referring to FIGS. 16A-19E, a second example embodiment is provided for an in-line modular device 100 that is arranged to locate between any type of lubricant receiver and any type of grease source. The second example embodiment may have similar features (or a subset) as what has been already described for the first example embodiment, but this is optional and not essential. See reference numerals in FIGS. 16A-19E for example. For the sake of brevity, physical features that may be present in both example embodiments (and already described with respect to the first example embodiment) will not be described again with respect to the second embodiment FIGS. 16A and 16B show an in-line modular device 100 that is connectable to a lubricant receiver.

FIGS. 17A-E show views of the control module 114 according to the second example embodiment. The control module 114 has a casing 138 with an upper portion and a lower portion. The control module 114 has a user interface, which preferably is or includes a visual display 136. The visual display 136 is preferably a colour display to easily indicate to the user if the correct lubricant type is being dispensed to the lubricant receiver, and to indicate to the user if too much lubricant is being dispensed (e.g. if the volume of lubricant volume dispensed exceeds the required lubricant volume as per the event schedule). The functional aspects of the user interface and visual display 136 will be described later. FIGS. 17A-E also shows the first coupling end according to the second example embodiment. The first coupling end is preferably threaded such that the fitting between the second coupling end and the outlet of a grease gun or pump 104 is adapted to allow for easy rotation and alignment when attaching the modular device 100 to the grease gun or pump. This allows for a desirably tight threaded connection into both the modular device and the grease gun or pump whilst ensuring the visual display 136 on the modular device is upright.

Figure 18A:
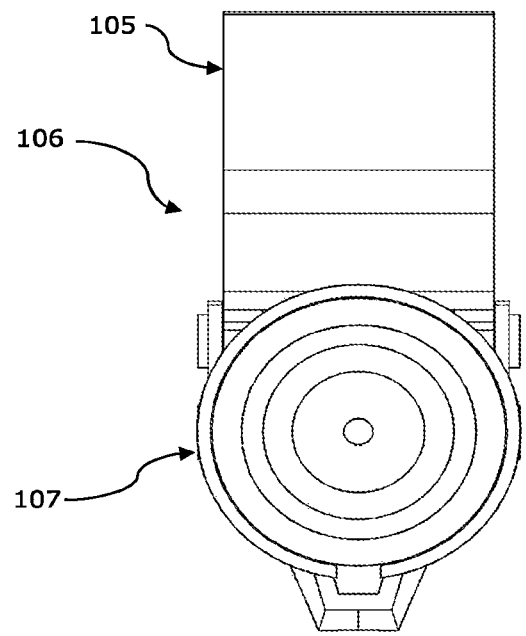
FIGS. 18A-C are respectively a front, perspective, and side view of an embodiment of the invention.
Figure 18B:
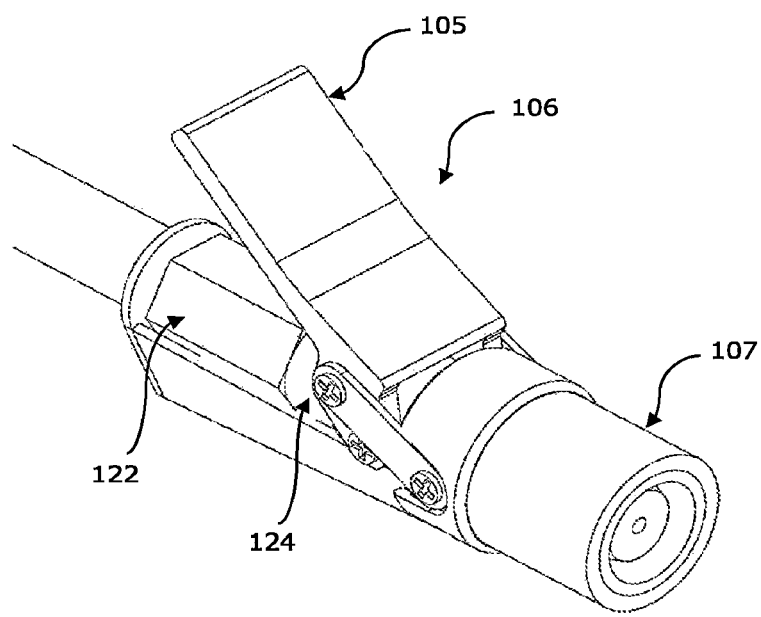
Figure 18C:
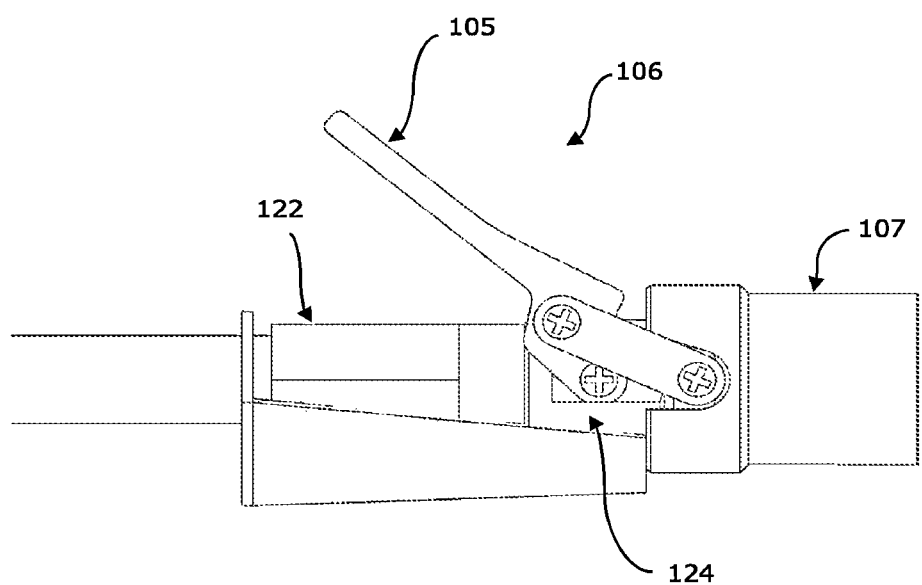

FIGS. 18A-C show the second coupling end.

Figure 19A:
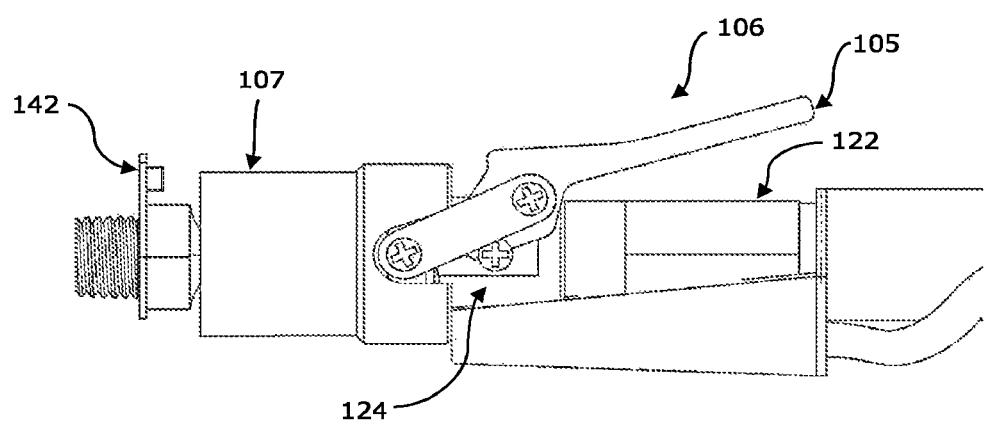
FIGS. 19A and B are side views of an embodiment of the invention.
Figure 19B:
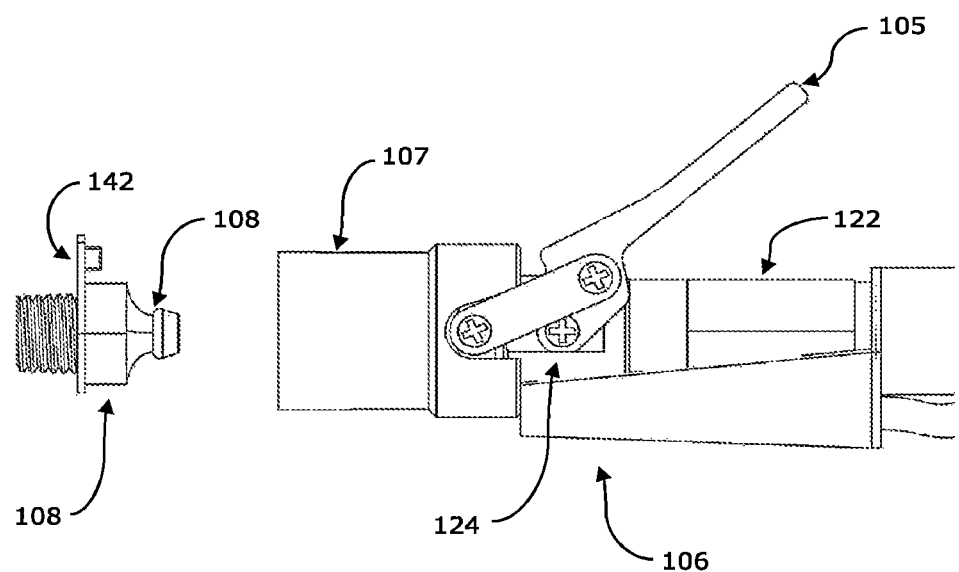

FIGS. 19A and B show the second coupling end attachable to a lubricant receiver, such as a grease nipple for example.

Figure 7:
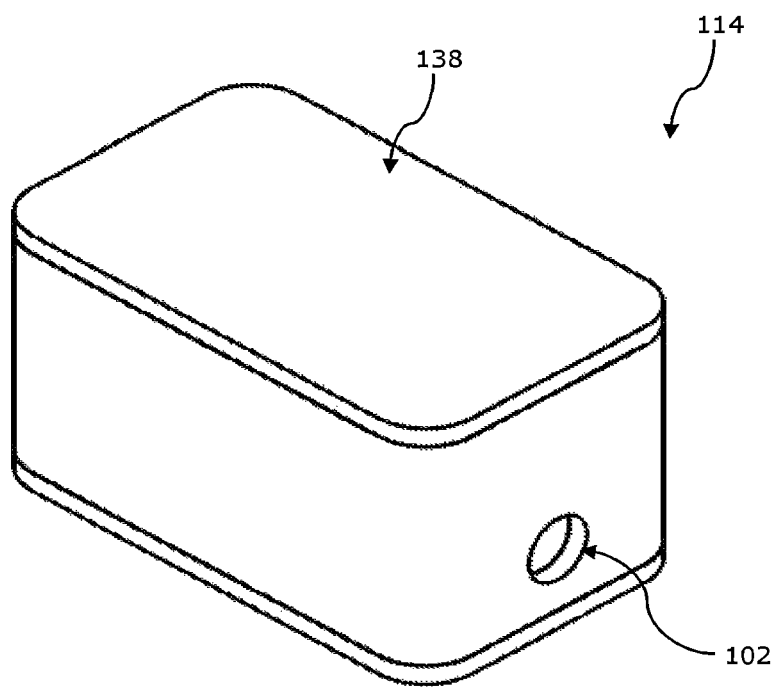
FIG. 7 is a perspective view of an embodiment of the invention.
Figure 8:
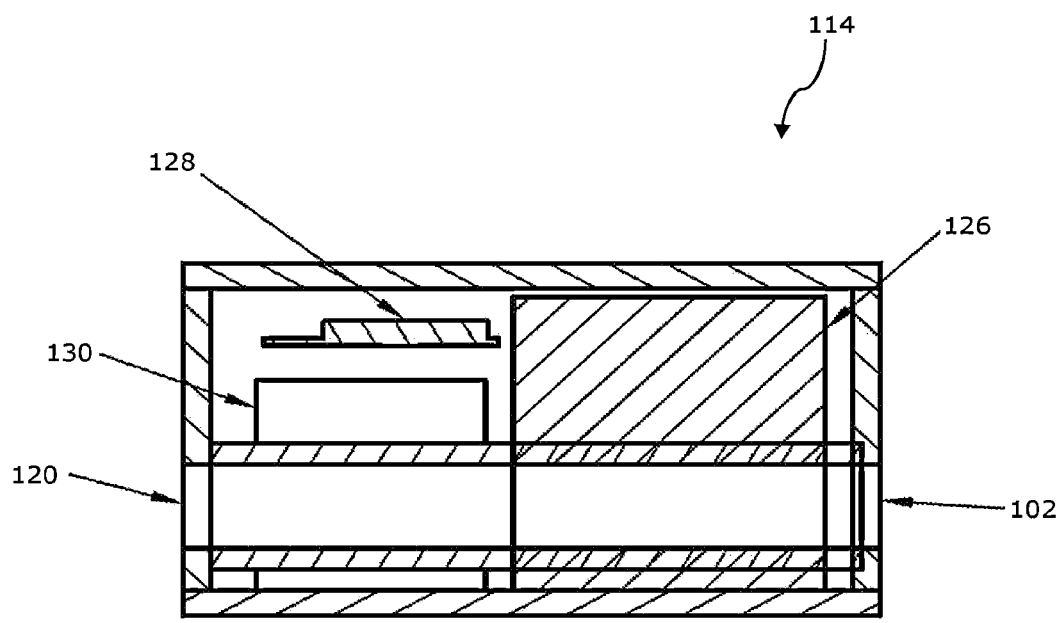
FIG. 8 is a cross section end view of an embodiment of the invention.

Referring to FIGS. 7 and 8, a third example embodiment is provided for an in-line device that is arranged to be attached between any type of lubricant receiver and any type of auto-lubrication device. In an embodiment, the first coupling end 102 includes an inlet attachment fixture that is configured to attach to an outlet of an auto-lubrication system or device (not shown). Whilst the above first and second examples of the device 100 are a modular in-line system that is arranged to be mobile, this third example of the device 100 is arranged to be attached to or integrated as part of a machine or plant and locate between the auto-location system and the lubricant receiver, such as a grease nipple or threaded opening.

The third example of the device 100, may also include at least one flexible connective portion (similar to the hose portion 116 of the first and second examples of the device 100) to connect the control module 114 of the third example to the auto-lubrication device or system. Similar fixtures, fittings and couplings to those described above in relation to the first and second aspects may also be utilised by the third aspect for similar purposed to those described above, such as the threaded connections.

1.3 Features of Modular Device

The following description relates to any of the first, second or third examples of the device 100 unless specifically mentioned otherwise.

With reference to FIGS. 5, 8, and 17A-E, the control module 114 includes at least one sensor. In an embodiment, the at least one sensor may be arranged to detect the volume of lubricant dispensed. For example the at least one sensor may include a flow measuring device, such as a flow meter 126, in fluid communication between the first end coupling 102 and the second end coupling 106. That is, the device 100 is arranged so that the lubricant passes from the source of lubricant, optionally along a flexible connective portion, into the control module 114, through the flow meter 126, out of the control module 114, optionally along another flexible connective portion and into the lubricant receiver. That is, the flow meter 126 may be arranged to measure the volume of lubricant dispensed by the source of lubricant into the lubricant receiver. The flow meter 126 should preferably be designed to handle high flow rates typically seen in the context of dispensing lubrication to a lubrication receiver.

Further, the flow meter 126 should be adapted to handle sand and grit which may be present the lubricant without performance being affected. Various types of different flow meters 126 may be used, such as positive displacement flow meters. In some embodiments, the flow meter 126 may be integrated into the lower portion of the casing 138 of the control module 114.

In an embodiment, the at least one sensor may be arranged to detect the pressure of lubricant dispensed. For example, the flow measuring device may include a means to measure the pressure of the lubrication dispensed. Pressure detection may be used to detect issues within the lubricant receiver. For example, if there is a blocked grease nipple or a damaged pin joint, the measured pressure can be used to indicate and alert the user of the issue. Further, the pressure measurement may be used to determine the volume of lubricant dispensed by inferring a volume of dispensed lubricant, being dispensed at a specific pressure measurement across a fixed period of time. For example, the flow measuring device may include, or be, a fluid pressure sensor.

Further, the at least one sensor may include other sensors, such as temperature, light, or vibration sensors, that may be provided to the control module 114, or indeed, may also be provided to other parts of the device 100, such as at or proximate to the second end coupling 106.

In an embodiment the control module 114 further includes a processing module and at least one source of memory. The control module 114 may have two or more sources of memory for allow for more data storage. In an embodiment, the processing module is configured to receive the data from the flow measuring device, such as the flow meter 126. By way of a non-limiting example in which the at least one sensor is the flow meter 126, the data from the flow meter 126 may be in the form of the number of rotations of the inner mechanism that has occurred. For example, where the flow meter 126 is a positive displacement type flow meter, the processing module may be arranged to determine the volume of the lubricant dispensed by using the known fixed volume of the displacement chambers within the flow meter multiplied by the measured number of rotations the inner mechanisms.

Additionally or alternatively, the processing module is configured to transmit data. For example the processing module can be configured to transmit data to an RFID tag provided to a lubricant receiver (more detail will be described later).

Within the context of the specification, a processing module is a computing device that includes at least one central processing unit (CPU) (i.e. a processor or microprocessor) and at least one source of memory that includes volatile (such as random access memory (RAM)) and non-volatile memory (such as a solid state drive) that may be provided to a printed circuit board (PCB). Further, the non-volatile memory may also include a removable source of memory. Further, the processing module may also include input and output interfaces to external devices and a communication module. The processing module may include the main board 128, which is in wired connection to the flow meter 126 and power source. As shown, the main board 128 is arranged proximate to the power source, which may include a rechargeable battery 130, which may be rechargeable through charging port 131. Alternatively, the rechargeable battery 130 may be charged using wireless induction charging technology, or a swappable battery (similar to what is used on power tools for example).

In an embodiment, the communication module may be attached to the main board 128 or may be arranged on a separate board in communication with the processing module. For example, the communication module may include a Wi-Fi chip (not shown) formed as part of the main board 128. In other embodiments, the communication module may include various hardware components to enable other forms of wireless communication such as LoRa, Bluetooth, HF, VHF, UHF, cellular, LTE-M and NB-IoT etc.

Figure 9:
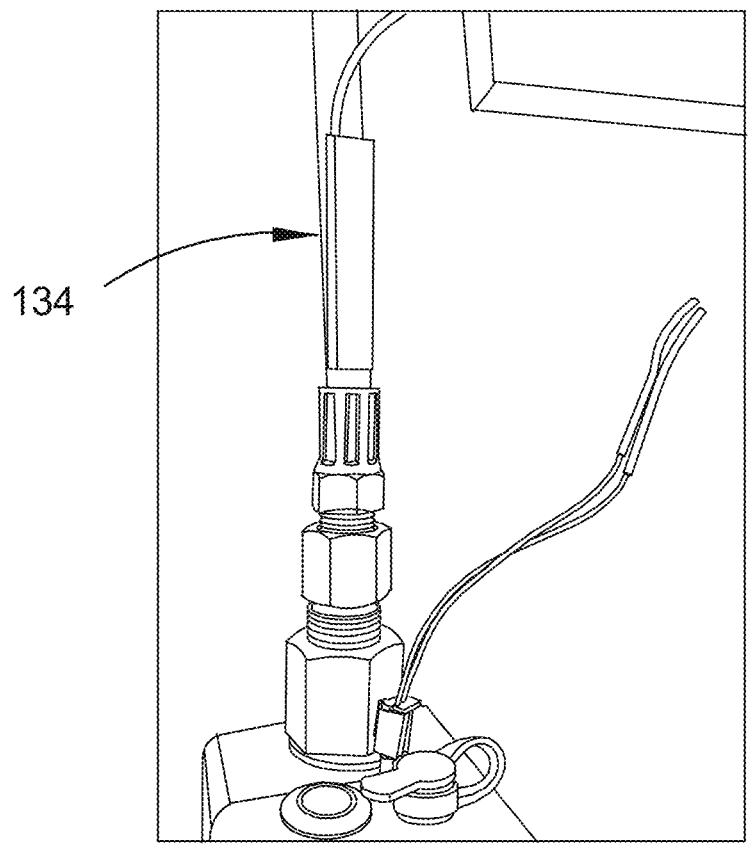
FIG. 9 is a perspective view of an embodiment of the invention.

The communication module may include one or more antennas used to transmit and receive data to and from a remote computing device (which is described in further detail below). For example, as shown in FIG. 3 an example of a flexible antenna 132 arranged to pass through casing aperture 133 (best shown in FIG. 6) is provided. Alternatively, as shown in FIG. 9, an alternative antenna 134 may be arranged to be integrally formed with or attached to the exterior of the control module 114 or the hose portion 116. In some embodiments, the antenna may be a custom designed F type Flexible Printed Circuit (FPC) antenna. In such embodiments, it is preferable the FPC antenna is designed and tuned to operate in environments where metal is proximate such that the presence of metal has the potential to distort the radiation pattern of an antenna. In an embodiment, the communication module may be configured to transmit information between the processing module and the remote computing device. The remote computing device may include a remote server. The remote server may be a cloud-based server or a local network server. The remote server is discussed in further detail later in the specification.

Figure 4:
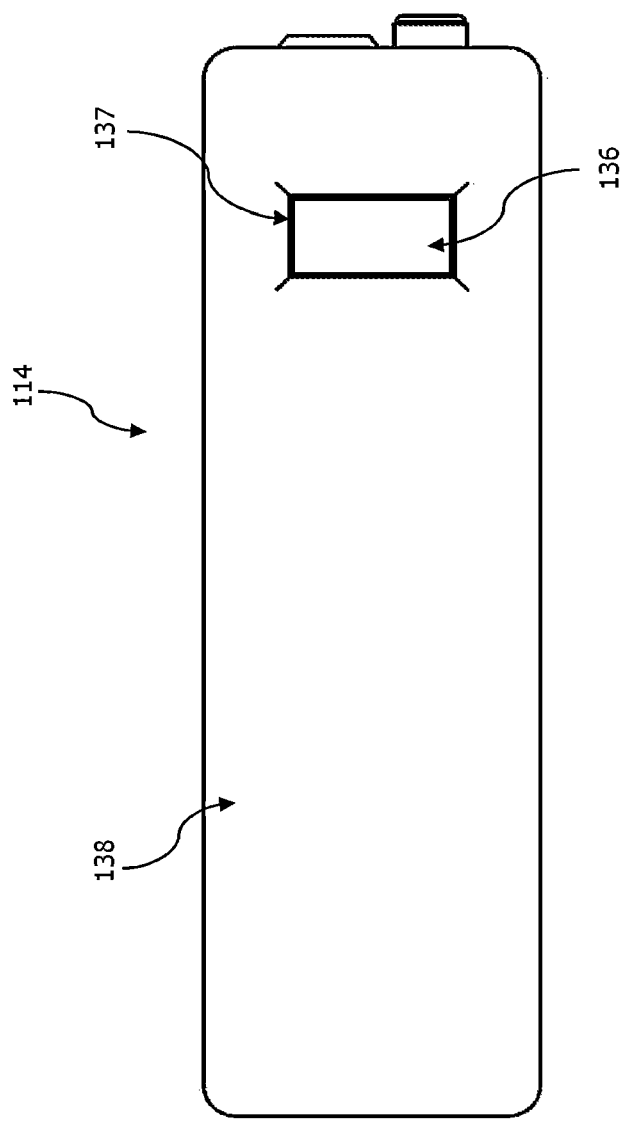
FIG. 4 is a top view of an embodiment of the invention.
Figure 5:
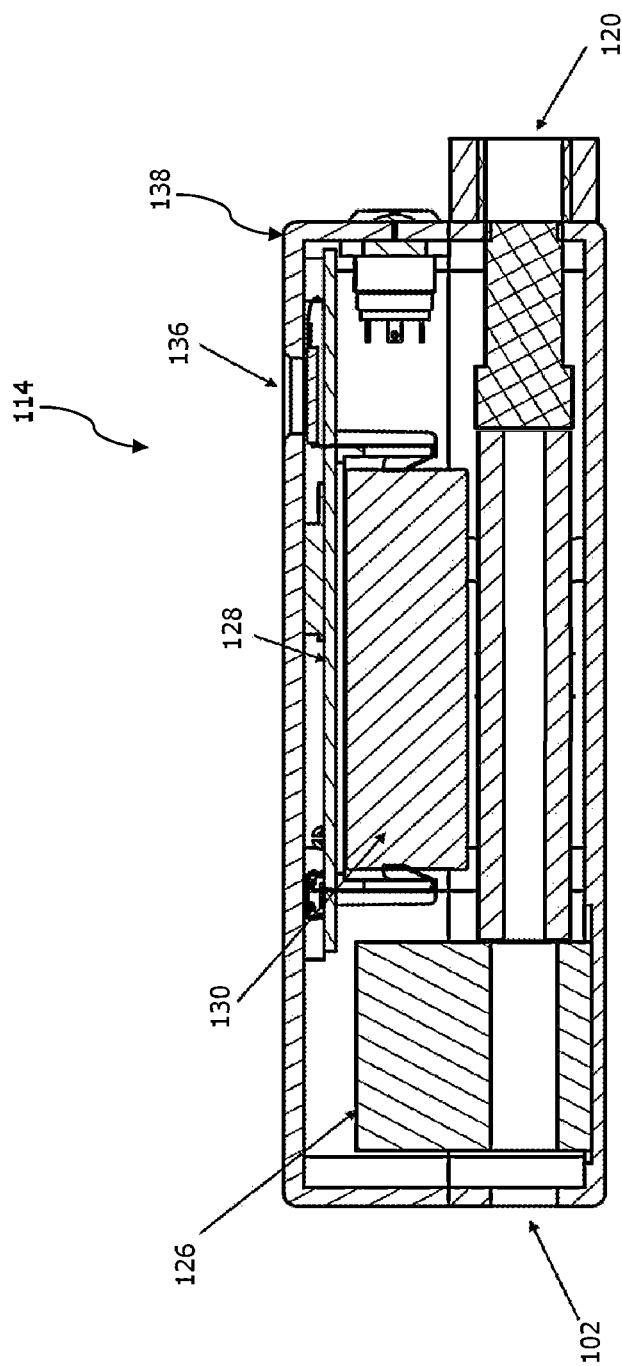
FIG. 5 is a side cross sectional view of an embodiment of the invention.
Figure 6:
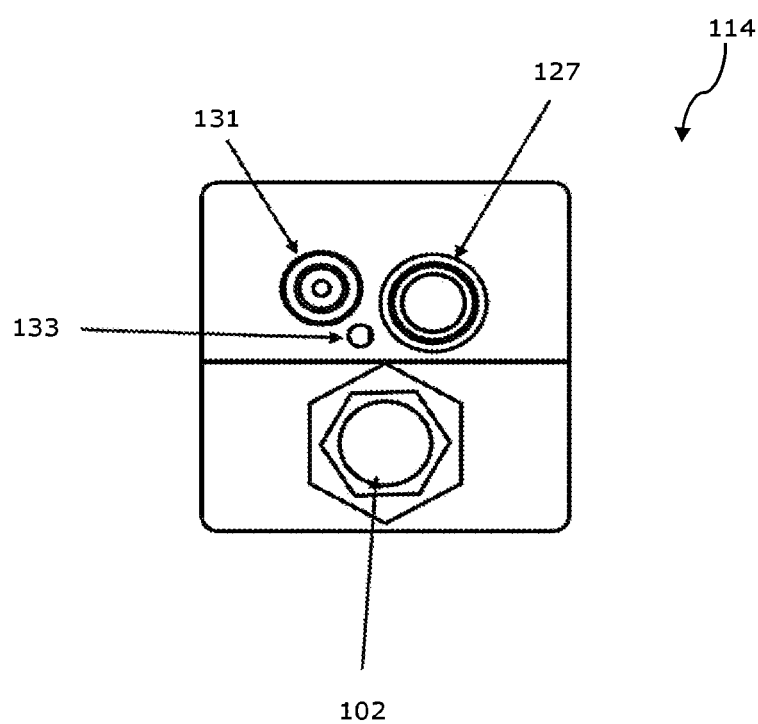
FIG. 6 is a right end view of an embodiment of the invention.

In a further embodiment, the control module 114 may include a user interface module. The user interface module may be arranged to display information to a user regarding the use or status of the device 100. Further the user interface module may be arranged to receive information from the user regarding the use or status of the device 100. For example, as shown in FIGS. 3, 4 and 9, an example of a user interface is provided as a visual display 136. The visual display 136 may be controlled by the processing module and may also be formed as part of the main board 126. Alternatively, the visual display 136 may include a user interface dedicated processor (not shown) that is arranged as part of or separately to the main board 126. Further, additional dedicated processors (not shown) may also be included for handling other tasks and processes. For example, dedicated processors may be provided for processes such as reading sensors, managing data transfer etc.

In a further embodiment, the user interface may also include light emitting diode devices (LEDs) (not shown) for visual feedback and/or speakers or vibration devices to provide audio or haptic feedback to the user (not shown). Alternatively, the user interface may also include at least one user input device to allow the user to provide information to the processing module. For example, the at least one user input device may include one or more buttons. For example such as the power and interface button 127 shown in FIG. 6. Although only one button is shown, it is understood a plurality of interface buttons may be provided. Alternatively or in addition to, a touch screen interface (not shown) may also be provided.

In a further embodiment, the control module 114 may include an accelerometer to activate the device 100 after periods of inactivity so that the user does not need to manually power on the device 100 (by switch/button for example). In embodiments including an accelerometer, the user picks up the device 100 to wake the device 100 from sleep.

The term "user" may define a human user that directly operates the device. Alternatively, the term "user" may define a human user that remotely operates the device by means of a remote or partially autonomous platform. In a further embodiment, a "user" may also include an autonomous control system that operates the device in accordance with pre-programmed rules and objectives. As such, an embodiment includes an implementation of remote operation using a third party "drone" technology or other such unmanned ground or air vehicles.

Referring again to FIG. 4, FIG. 7, and FIGS. 17A-E, the control module 114 may include a casing 138, which is arranged to protect the above and below described electrical and computing components of the control module 114 from physical damage or damage from water or other contaminants. The casing 138 may be configured to include various types of electrical insulation to reduce the likelihood of creating a spark ignition. The casing 138 may also include an interface aperture 137 to enable the user to view the user interface, which is described in further detail below. The casing 138 may also be configured to allow easy attachment to wireless charger (not shown), storage holder (not shown) or transport holder (not shown).

Figure 10:
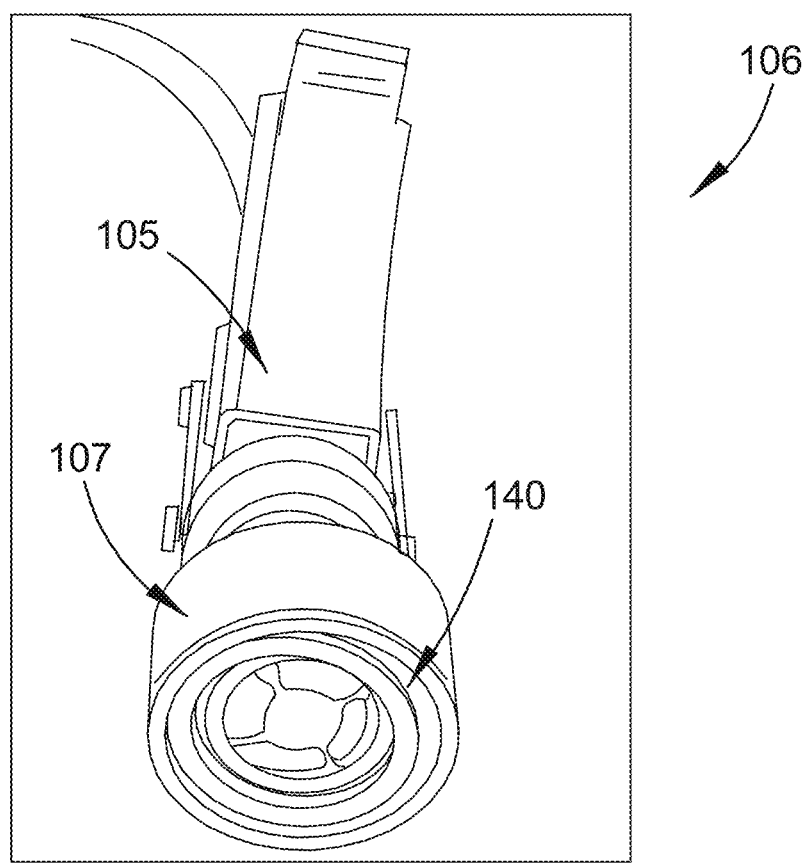
FIG. 10 is a perspective view of an embodiment of the invention.

In an embodiment, the control module 114 further includes a Radio Frequency Identification (RFID) device in communication with the processing module. The Radio Frequency Identification (RFID) device may be formed as part of the main board 128 or arranged with a separate dedicated processor module that is in communication with the main board 128. The RFID device is configured to read and/or write data to an RFID tag provided to a lubrication receiver of a machine. The RFID device may be arranged in communication with a RFID antenna 140, for example by means of electrical wires or conduit 112 that may be arranged to extend alongside, or are integrated with, the hose portion 116. An example of the RFID antenna 140 is shown best in FIG. 10 and is arranged to locate around the opening of the nipple coupling 107. The RFID device may be an RFID reader device 144, an RFID writer device 145, or both. The RFID reader and writer devices may be separate RFID devices, or a combined RFID device. That is, there can be a single RFID device which has both reading 144 and writing 145 functions. As the RFID antenna can be used to transmit and/or receive data, the RFID antenna can considered to be part of the RFID reader 144 and/or writer 145.

A skilled person will appreciate that there are a number of wireless standards/protocols that can be implemented so that the RFID device can read and/or write data to the RFID tag. One such example is the Near Field Communication (NFC) set of protocols. However a skilled person will recognise that other future wireless standards/protocols not yet developed may be used as well.

2. RFID Tag

Figure 20B:
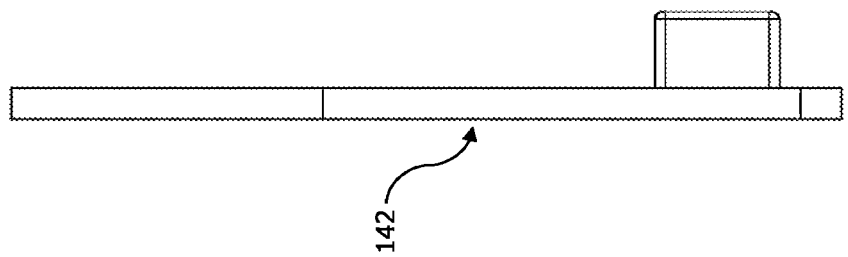
FIGS. 20A and B are respectively a front and side view of an embodiment of the invention.
Figure 20A:
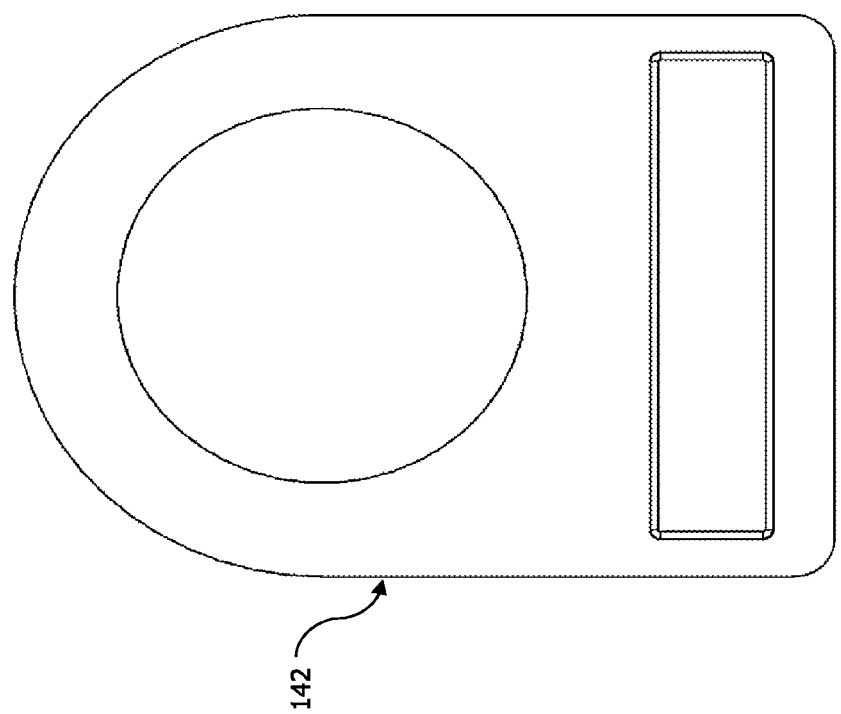

In an embodiment, the machine may include a RFID tag located at or proximate to the lubrication receiver. Referring to FIG. 2, an example of an RFID tag 142 including a plastic or rubber covering/coating is shown around grease nipple 108 and an example of the RFID tag 142 without the silicon cover is shown in FIG. 3. The RFID tag may also be adhered to a tab or label attached to the lubrication receiver such that the RFID tag 142 is proximate to the RFID antenna 140 when the second end coupling 106 is connected to the lubrication receiver. The RFID tag, tab or label may be arranged to locate between the lubrication receiver and the grease nipple 108. Referring to FIGS. 20A and B, another example of an RFID tag 142 is shown, with FIG. 20A showing a front view, and FIG. 20B showing a side view.

Figure 21A:
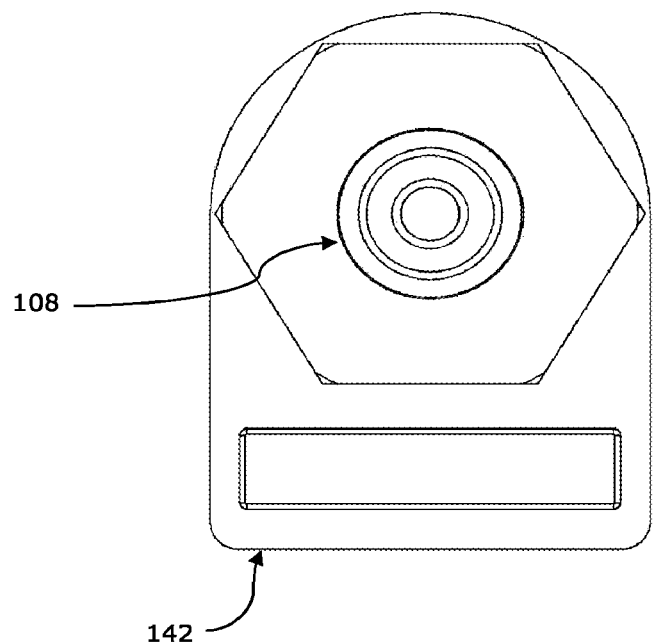
FIGS. 21A-C are respectively a front, perspective, and side view of an embodiment of the invention.
Figure 21B:
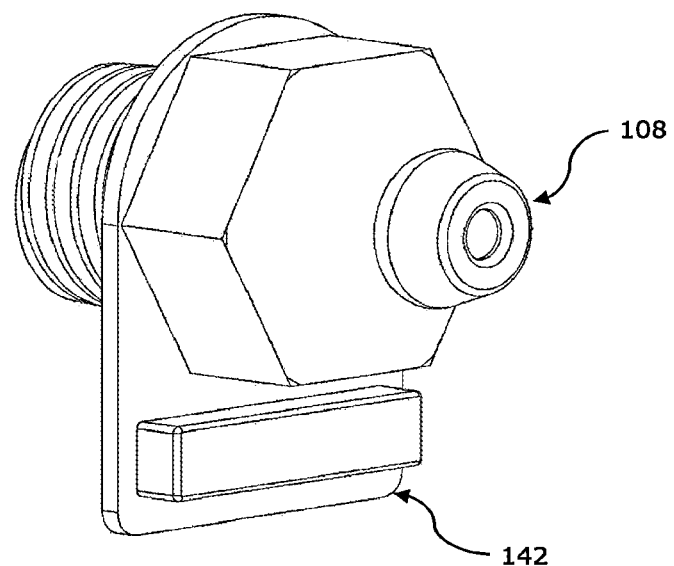
Figure 21C:
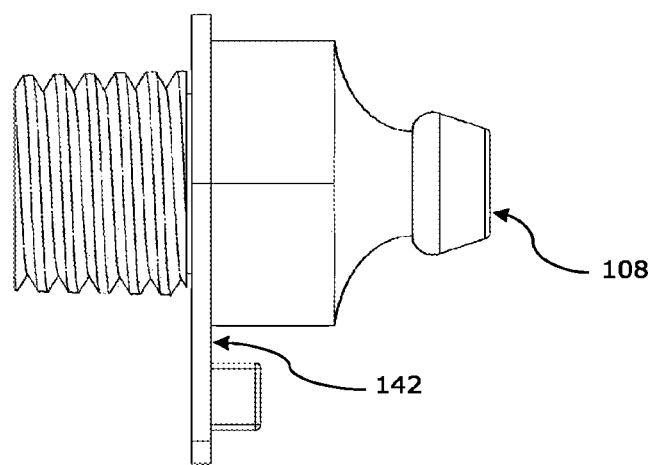

The RFID tag is shown encased in a coating/covering. FIGS. 21A-C show the RFID tag 142 of FIGS. 20A and B attached to a grease nipple 108, with FIG. 21A showing a front view, FIG. 21B showing an isometric view, and FIG. 21C showing a side view.

In an embodiment, the RFID antenna 140 is configured to receive the RFID tag data stored on the RFID tag 142 when the second end coupling 106 is attached or proximate to the location of the lubrication receiver. That is, when the second end coupling 106 is close to or in connection with the grease nipple 108, the RFID antenna 140 provided to the second end coupling 106 receives the RFID tag data stored on the RFID tag 142. In an embodiment, the RFID tag data includes a unique identification number assigned to the particular lubrication receiver. Further, the RFID tag data may include such as a human readable name for the lubrication receiver, or last grease date. The RFID tag data may be fixed data or may be data that is modifiable by the device 100.

As will be discussed in more detail later, some embodiments of the device 100 may have an RFID writer 144. The RFID writer 144 can be used together with the RFID antenna 140 to transmit data to the RFID tag 142, such that data is written onto the RFID tag 142.

Although the examples described above involve providing RFID tags to lubrication receivers as a means of identification, a skilled person will realise that RFID tags can also be used for other, non-greasing related tasks. For example, RFID tags can additionally be used to ensure non-greasing tasks are being performed on the correct machinery. Some examples of non-greasing tasks could include verifying torque (of a bolt), or checking oil levels. In such situations, when the device 100 scans the RFID tag, a (non-greasing) event can be recorded to verify that the non-greasing task has been completed.

Although the RFID tags 142 as described can be used to help identify the lubrication point, there are other mechanisms that can be used alongside or alternatively to RFID tags. For example, in embodiments where the device 100 is connected to an auto-lubrication device, the device need not scan the RFID tag to identify the lubrication receiver the device 100 is being connected up to. Instead, the processing module may be assigned to a lubrication receiver via information sent from the remote computing device. For example, in applications where the device is connected to an auto-lubrication device, the device 100 will be in a fixed position. The modular device 100 is paired with the location of the auto-lubrication device (via the processing module for example). That is, the serial number, MAC address, and/or some other identifier of the modular device 100 can be matched to the location of the auto-lubrication device so that the system has a record of which auto-lubrication device the modular device 100 is attached to.

Referring to FIGS. 22A to 24B, there is provided an example of a fitting 160 for attaching an RFID tag 142 to a lubrication receiver. The fitting 160 comprises a body 162 adapted to receive an RFID tag 142. The body is adapted such that the RFID tag attaches to the lubrication receiver by attaching at least a portion of the body to the lubrication receiver. Such fitting provides an easy option for attaching the RFID tag to a lubrication receiver, preferably an easy snap-fit option.

A preferred embodiment of the fitting 160 will now be described with references to FIGS. 22A to 24B. The fitting 160 comprises a body 162 having an opening 164. The body 162 may also comprise a holder 166 that is adapted to receive an RFID tag 142. The opening is adapted such that the RFID tag attaches to the lubrication receiver by clipping the opening to the lubrication receiver.

Figure 24A:
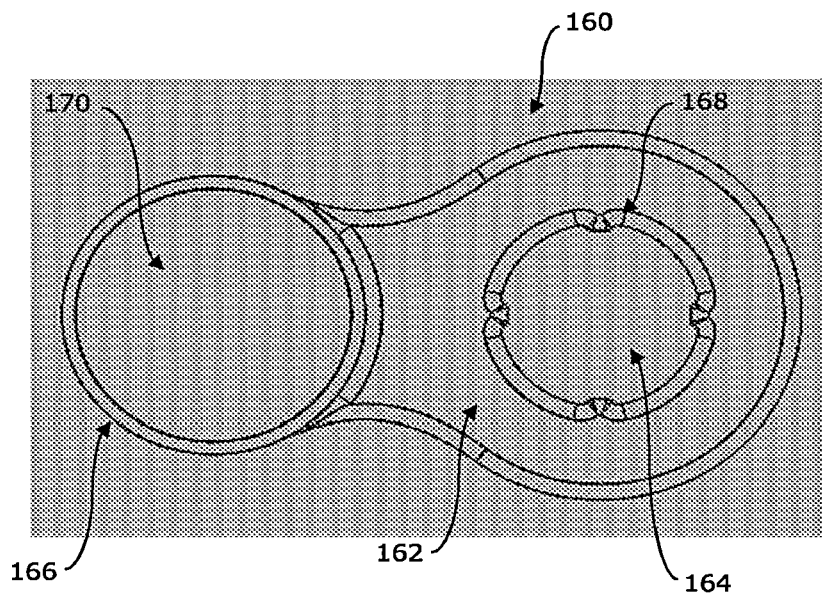
FIGS. 24A and B are respectively a top and perspective view of an embodiment of the invention.
Figure 24B:
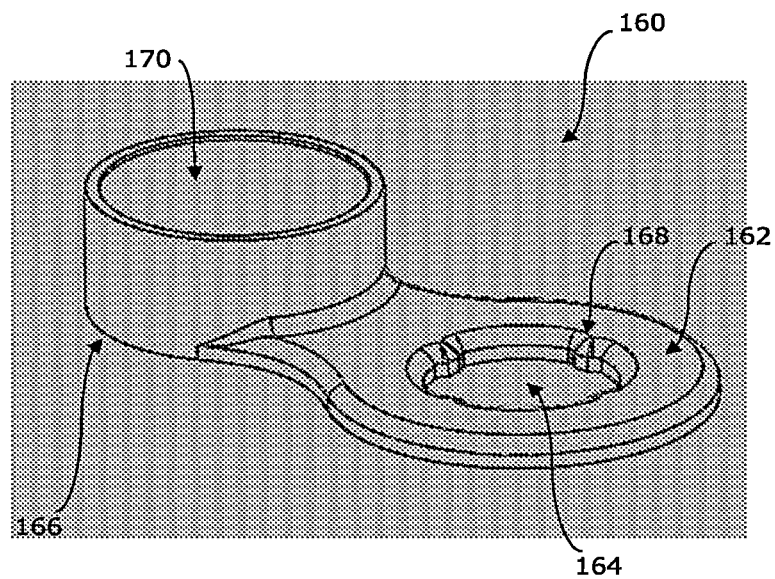

The fitting of FIGS. 22A to 24B comprises a body 162 which is shown as a tab in these Figures. The tab has an opening 164 that clips onto the lubrication receiver, which could be a grease nipple 108 for example. The opening 164 should be appropriately sized such that the opening 164 fits snugly around the lubrication receiver. Moreover, the opening 164 should be appropriately sized such that friction between the opening 164 and the lubrication receiver holds the fitting 160 in place, therefore keeping the RFID tag attached to the lubrication receiver. The opening 164 may be substantially circular, but other shapes may be used as an alternative, as along as the opening fits snugly around the lubrication receiver. The opening may have one or more notches 168 to enable clipping to the lubrication receiver, however other clipping mechanisms may be used, additionally or alternatively. The notches as shown in FIGS. 23A, 24A, and 24B, are located around the edge of the opening 164.

Figure 22A:
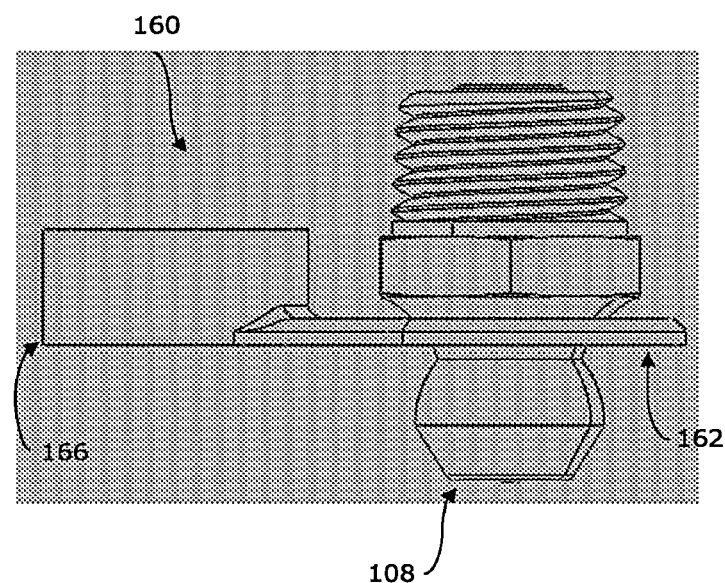
FIGS. 22A-C are respectively a side, top, and perspective view of an embodiment of the invention.
Figure 22B:
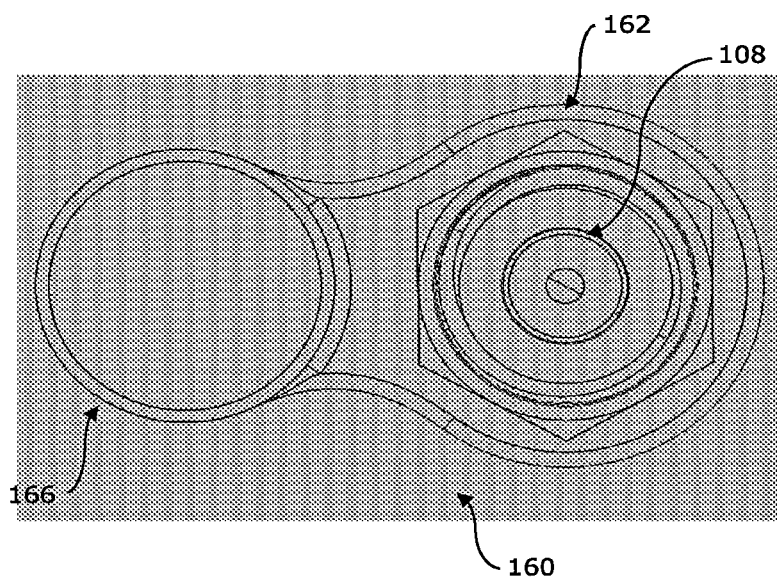
Figure 22C:
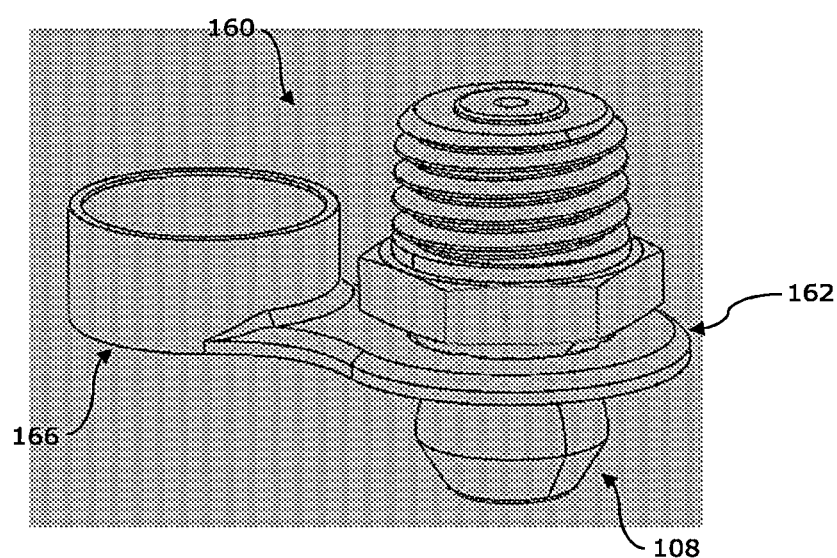
Figure 23A:
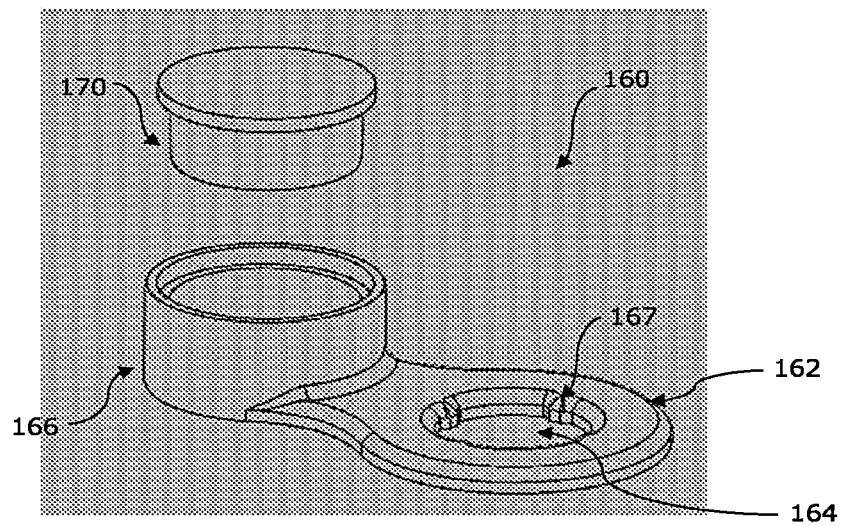
FIGS. 23A-E are respectively a perspective, side, cross section side, cross section side, and side view of an embodiment of the invention.
Figure 23B:
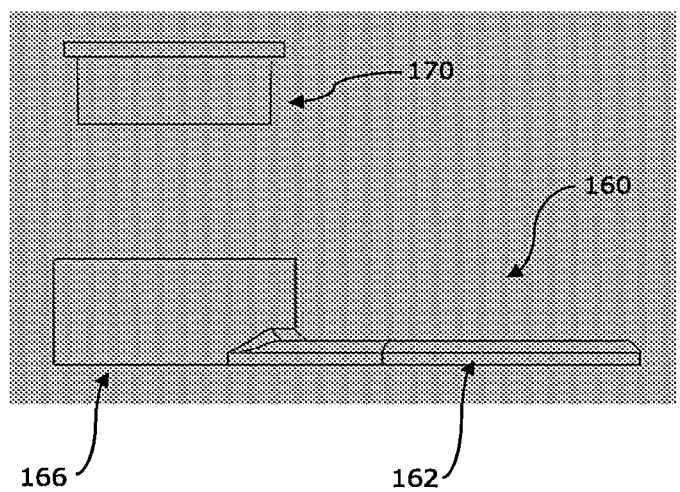
Figure 23C:
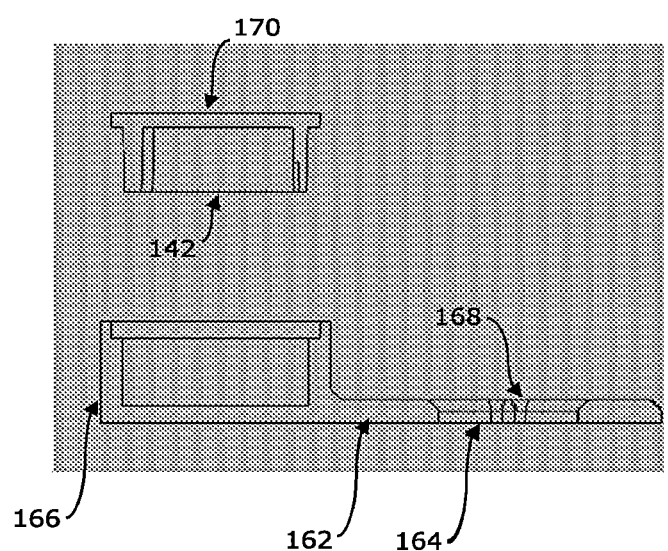
Figure 23D:
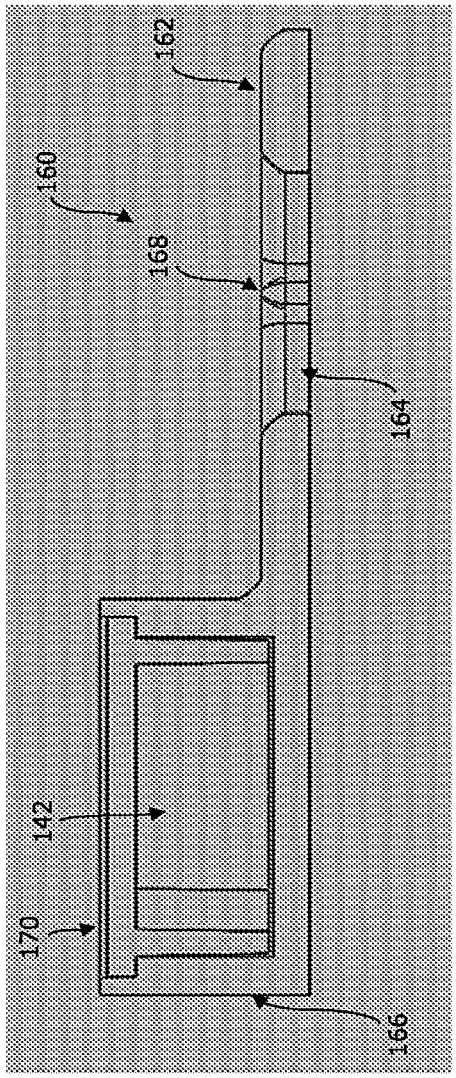
Figure 23E:
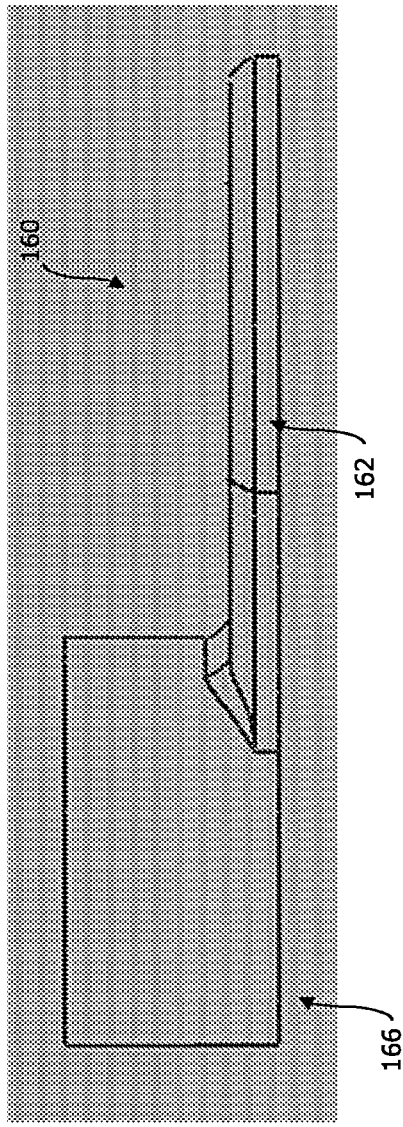

In the fitting 160 of FIGS. 22A to 24B, the body 162 also comprises a holder 166. The holder 166 is adapted to receive the RFID tag 142. The holder 166 should be appropriately dimensioned such that the RFID tag 142 fits snugly into, by, or around the holder 166. In some embodiments, the holder 166 could be a cavity or receptacle that contains the RFID tag, however other holding arrangements may be used instead. As shown in FIGS. 23A-C, the RFID tag can be inserted into and removed from the holder 166. When installed onto the lubrication receive, the fitting 160 may be inverted as shown in FIGS. 22A-C, however it may not be. It is therefore desirable that the holder 166 is appropriately sized for a snug fit such that the holder 166 prevents the RFID tag from falling out if inverted, yet allows for easy insertion and/or removal of the RFID tag. The holder 166 may be substantially circular, but other shapes may be used as an alternative, as along as the RFID tag 142 fits snugly into, by, or around the holder 166. In some embodiments, the RFID tag may be inserted into a capsule 170 to protect the RFID tag 142. The capsule 170 in turn is placed into the holder 166 so that the holder 166 receives the RFID tag 142, with the RFID tag 142 safely enclosed in the capsule 170 and in the holder 166.

The advantages of the fitting as described are explained later in the description.

In some embodiments, it is desirable that (at least) the body 162 is thin enough to enable a second coupling end of the modular device 100 to attach to the lubrication receiver. In some embodiments, it is desirable that fitting 160 is further adapted to be quickly attachable to the lubrication receiver. In some embodiments, it is desirable that the fitting is further adapted to be resistant to one or more of: vibration, chemicals, heat and cold.

4. Systems and Methods for Dispensing Lubrication

Discussion now turns to exemplary systems that the device 100 can be used as part of for dispensing lubrication. The first system will first be discussed with reference to FIGS. 11-15, and the second system will then be discussed with reference to FIGS. 25 and 26. It should be noted that both systems are designed to operate where there are one or more users/devices. That is, both systems are designed to allow for a plurality of users (with each user having a modular device) to dispense lubricant.

4.1 First System

The first system 200 will now be described with reference to FIGS. 11-15.

Figure 11:
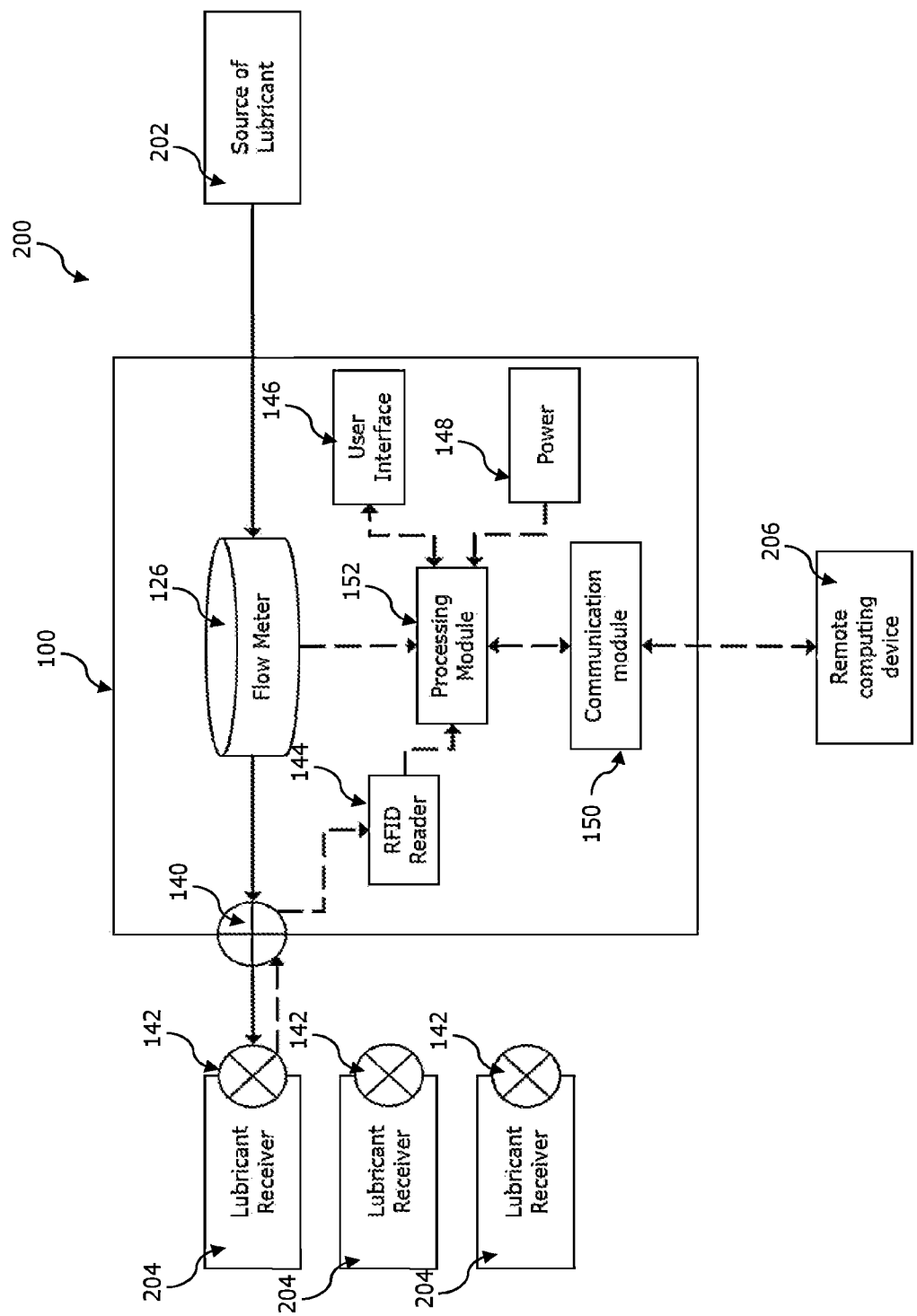
FIG. 11 is a system diagram illustrating an embodiment of the invention.

Referring to FIG. 11, there is provided an example of a system 200 for dispensing lubrication, including the device 100 connected to a source of lubrication 202 and a plurality of lubricant receivers 204. The plurality of lubricant receivers 204 may be provided to a single machine or may be provided to multiple machines.

RFID tags 142 may be provided respectively to the plurality of lubricant receivers 142. The RFID tag 142 may be attached to the lubrication receiver 142 using a fitting 160.

The device 100 in the system 200 may include some or all of the features as described above. For example, the device 100 may include the flow meter 126, RFID antenna 140, RFID reader 144, user interface module 146, power module 148 and communication module 150, and an accelerometer (not shown) all arranged in communication with the processing module 152. The communication module 150 is arranged in communication with the remote computing device 206 (may be interchangeable with the term "external computing device"). The dashed arrows connecting these features illustrate the direction of the flow of information, data, or electrical current, whilst the solid arrows indicate the direction of the flow of lubricant.

In an embodiment, the system 200 may include the modular device 100 for dispensing a lubricant, where the modular device 100 is attachable between the source of lubrication and the plurality of lubrication receivers 204. Further, the system 200 may include a remote computing device 206 arranged to communicate with the modular device 100. The remote computing device 206 may be arranged to receive event log data relating to completed lubrication tasks in accordance with an event schedule, the remote computing device further arranged to provide an updated event schedule for the next period, wherein the modular device 100 guides the user to lubricate each of the plurality of lubrication receivers 206 in accordance with the updated event schedule. These features are described in further detail later in the specification.

The remote computing device 206 may include a remote cloud based or local network server, where the device 100 is in direct communication with the remote computing device 206 via a communications network. In, another embodiment, system 200 may also include a median device (not shown) that acts as an intermediary in facilitating the transfer of data from the device 100 to the remote computing device 206.

The communication module 150 may communicate with the remote computing device 206 over a data network, for example, via the Internet or a Wide Area Network (WAN). Alternatively, the remote computing device 206 may include other computing devices such as, a thin client device, further processing system, notebook computer, mainframe computer, mobile device, database, etc. As such, a large variety of other types of terminals or configurations may also be utilised. The transfer of information and/or data over the data network may be achieved using wired communications means or wireless communications means. Further, the data network may include or form part of other communication networks, such as LAN, WAN, Ethernet, token ring, FDDI ring, star, etc., networks, or mobile telephone networks, such as GSM, CDMA, 3G or 4G etc., networks, and may be wholly or partially wired, including for example optical fibre, or wireless networks, depending on a particular implementation.

The remote computing device 206 may be configured to store and process information relating to the lubrication of the plurality of lubricant receivers 204 and the operation of the device 100. For example, the remote computing device 206 may include a list of all of the plurality of lubricant receivers 204. Further, the remote computing device 206 may include a lubrication event schedule for each service period, which is a list of the plurality of lubricant receivers 204 that need to be lubricated within that service period, the service period being a predetermined period of time, such as a 12, 24 or 42 hour period.

For each of the plurality of lubricant receivers 204, the lubrication event schedule may also include the unique identification number of the RFID tag 142 provided to the lubricant receiver, the required volume of lubricant to be dispensed to the lubricant receiver, the type of lubricant to be dispensed to the lubricant receiver, the last time the lubricant receiver was lubricated and the next time that the lubricant receiver should be lubricated.

Figure 12:
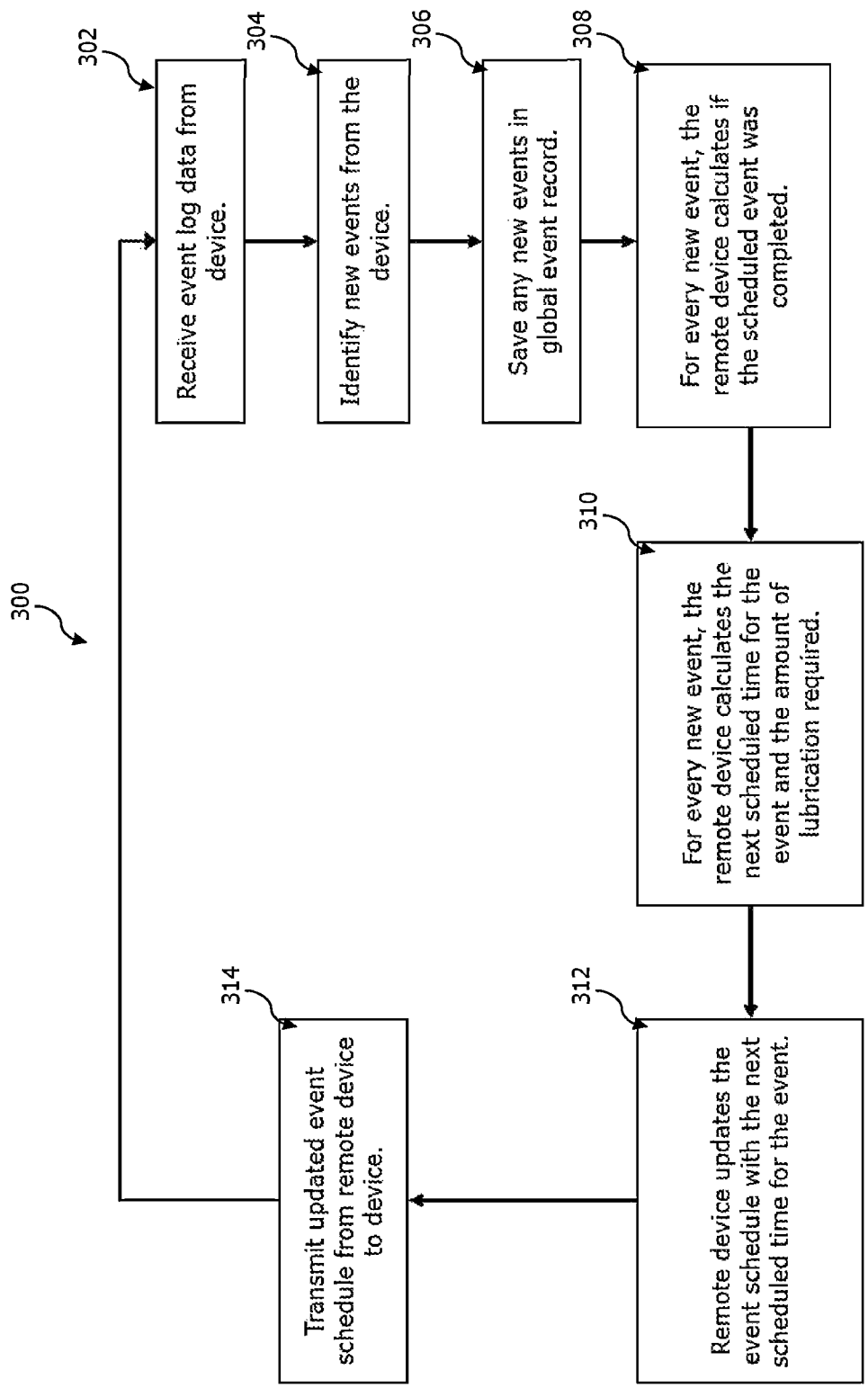
FIG. 12 is a flow chart illustrating an embodiment of the invention.

Referring to FIG. 12, there is provided an example of the steps taken by the remote computing device 206 in the process of updating the lubrication event schedule 300. Firstly at step 302 the remote computing device 206 receives event log data from the device 100 collected during a service period. The event log is defined as being a list of completed lubrication tasks as undertaken using the device 100 by following current event schedule. The event log data may include a list of lubricant receivers that were lubricated, where the lubrication of each of the lubricant receivers is referred to as an "event". Further, for each event, other metadata may also be included in the event log, such as the unique identification number of the RFID tag 142 provided to the lubricant receiver, the unique identification number of the user operating the device 100, the time the lubricant receiver was lubricated, the volume of lubricant dispensed, the type of lubricant dispensed and the unique identification number of the device 100. The device 100 may be arranged to determine whether the event was conducted at the time that it was scheduled, and if the event was carried out later than scheduled, the device 100 to determines and displays by the amount of delay.

At step 304, the remote computing device 206 identifies the new events from the device 100 and then at step 306, saves the new events to a global event record of all lubrication events for the device 100. At step 308, for each new event, the remote computing device 206 determines from the event log whether the correct lubricant receiver was lubricated, using the correct lubricant and lubricated to the correct amount. A new event is defined as a completed lubrication event that has not be previously recorded on the global event record database 412, which is described more fully below.

Further at step 310, for each new event, the remote computing device 206 determines a next scheduled time for each of the plurality of lubricant receivers 204. That is, the remote computing device 206 schedules the next lubrication event for each of the plurality of lubricant receivers 204 that have just been lubricated. The list of the scheduled times for the lubrication of each of the plurality of lubricant receivers 204 within the current period is referred to as the current event schedule and the list of the future scheduled times for the lubrication of each of the plurality of lubricant receivers 204 within the next period is referred to as the updated event schedule.

The determination of the next lubrication event for each of the plurality of lubricant receivers 204 may be in accordance with a fixed schedule based on the machine manufacture specification. Alternatively, the remote computing device 206 may store the data from the at least one sensor provided to the device 100, the one or more sensors provided to the RFID tag 142 and/or the operator of the device 100. The remote computing device 206 may be arranged to process the aforementioned data to determine the operational health of the machine and whether the amount of lubrication is sufficient. Such determinations may be made using machine learning algorithms and the like. The remote computing device 206 may then adjust the scheduling of the next lubrication event based on the above determination.

At step 312, the remote computing device 206 downloads the updated event schedule for the next period as determined by step 310 for the plurality of lubricant receivers 206. Then, at step 314, the remote computing device 206 transmits the updated event schedule to the device 100 for the user to operate the device 100 for the next service period.

Figure 13:
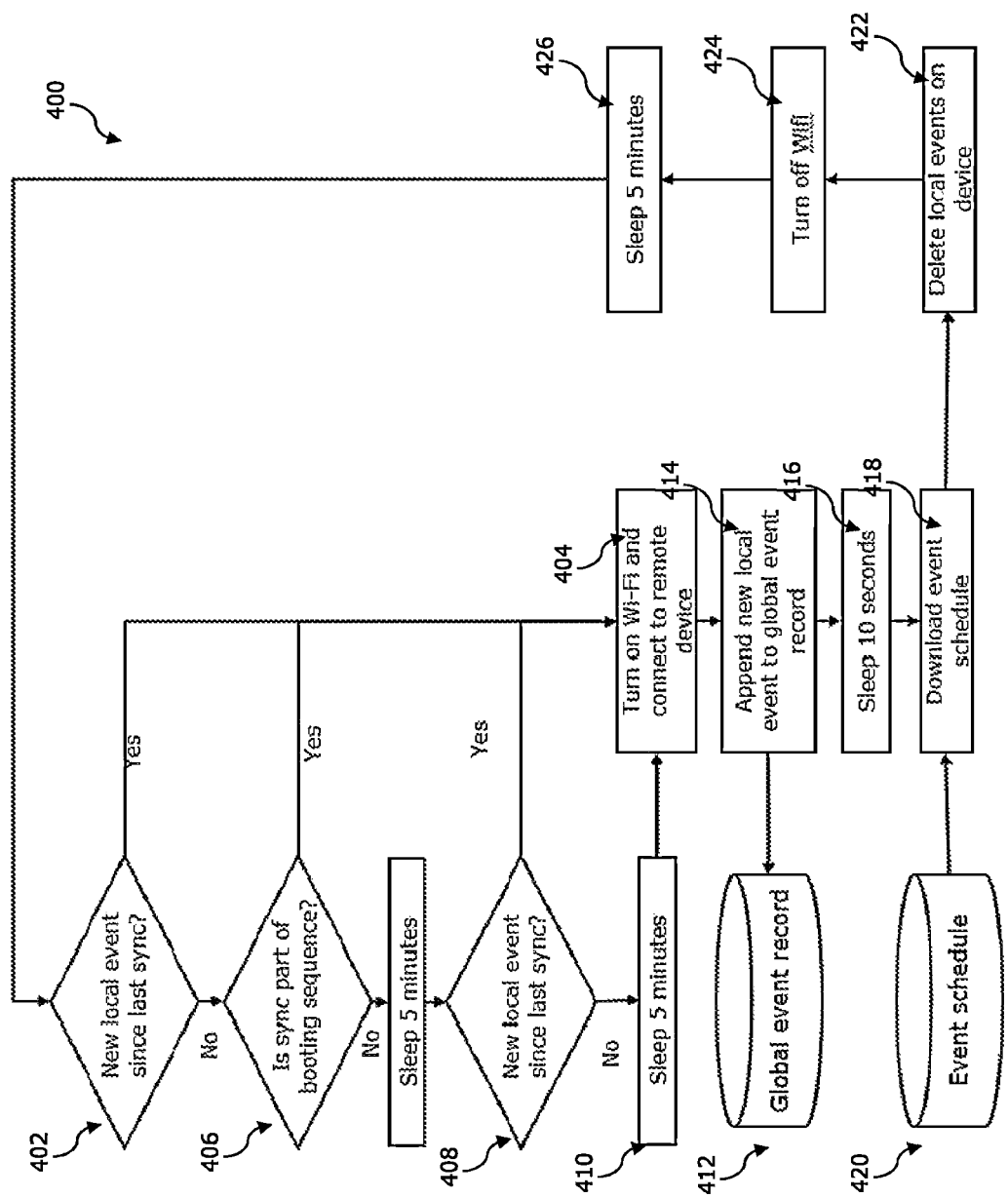
FIG. 13 is a flow chart illustrating an embodiment of the invention.

Referring to FIG. 13, an example of the syncing process 400 used by the device 100 to transfer and receive information from the remote computing device 206. Firstly, at step 402 the device determines whether a new event has been recorded on the device 100 and whether the device is operational, and if so, the communication module is turned on at step 404 (in this example the communication module includes a Wi-Fi chip). If there is no new events, then the device 100 determines whether the sync process is initialled as part of a booting sequence or device start-up procedure at step 406, where if so, the communication module is turned on at step 404. However, if the sync process is not part of a booting sequence, then the device 100 switches to a sleep or low-power mode for a period (for example five minutes) and checks again whether a new event has been logged at step 408, where if so, the communication module is turned on at step 404. However, if no new events have been logged, then the device switches to a sleep or low-power mode for a period (for example five minutes) at 410 and then turns on the communication at step 404.

Once a new event has been identified, the device 100 writes the new event stored locally on the device 100 to the global event record database 412 at step 414, where the global event record database 412 is formed as part of, or a separate database accessible by, the remote computing device 206. Once the new events have been saved, the device 100 switches to a sleep or low-power mode for a period (for example ten seconds) at 416 before step 418 of downloading the updated event schedule from the global event schedule database 420 for next service period, where the global event schedule database 420 is formed as part of, or a separate database accessible by, the remote computing device 206.

Once the updated event schedule has been downloaded to the device 100, the event log of previously completed tasks stored locally on the device 100 is deleted, the communication module is turned off, and the device 100 switches to a sleep or low-power mode for a period (for example five minutes) at steps 422, 424 and 426 respectively.

Figure 14:
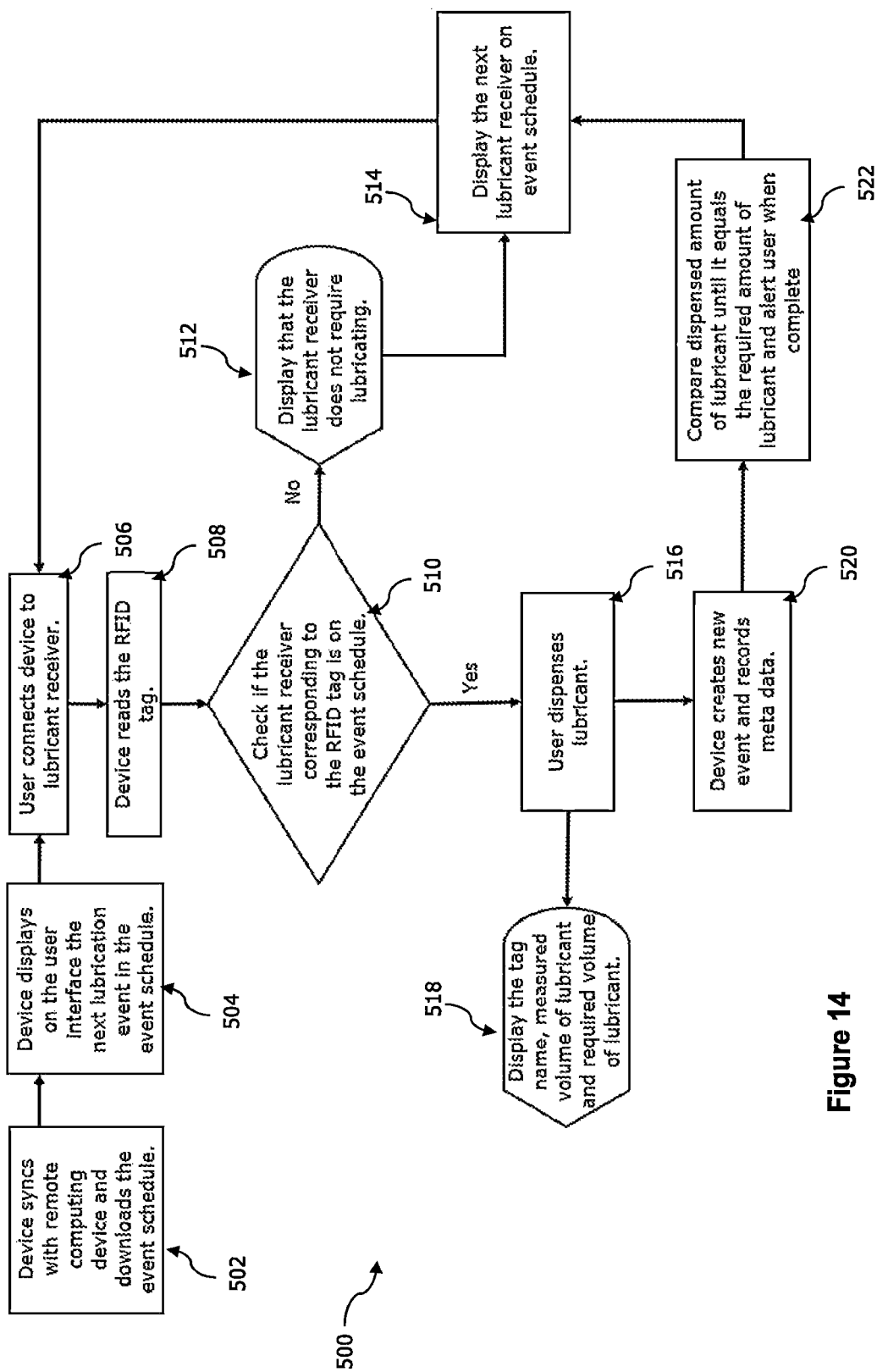
FIG. 14 is a flow chart illustrating an embodiment of the invention.

Referring to FIG. 14, an example of a method 500 for dispensing lubricant is provided. At a first step 502, the device 100 syncs with the remote computing device 206, in accordance with the method described in relation to FIG. 12, and downloads the updated lubrication event schedule for the upcoming period by means of the communication module 150. The event schedule may be organised depending on a pre-set operational conditions, for example, the event schedule might include all events within a certain time period (for example a service period of 24 hours), a lubrication event area that has been configured for the device 100 (i.e. limits the schedule to only machines in a specific area), and/or the type of lubrication provided to the device 100.

The device 100 saves the updated event schedule to the processing module 152, where in doing so, the updated event schedule becomes the event schedule for the current period, and displays the event schedule to the user of the device at step 504 using the user interface 146. For example, the user interface 146 may display at list of events or separate events shown as a sequence on the visual display 136. The order of the list or sequence may be user ordered or the order may be derived from a logical sequential ordering of the plurality of lubricant receivers 204 based identifying the next nearest lubricant receiver to lead the user through the plurality of lubricant receivers 204 along the most safe or efficient path.

At step 506, the user connects the second coupling end 106 of the device 100 to the lubrication receiver. The act of connection or the proximity of the second coupling end 106 to the lubrication receiver enables the RFID antenna 140 and RFID reader to read the data from the RFID tag 142 provided to the lubrication receiver at step 508.

At step 510, the device 100 compares the unique identification number of the lubrication receiver read from the RFID tag 142 to the event schedule and determines whether the lubrication receiver requires lubrication. If the unique identification number read from the RFID tag 142 is not on the event schedule, then the device 100 displays to the user that the lubrication receiver does not require lubrication at step 512 and then displays the next lubrication receiver on the event schedule at step 514.

If the unique identification number read from the RFID tag 142 is on the event schedule, then the user dispenses the lubricant from the source of lubrication at step 516. The device 100 then displays at step 518 the unique identification number read from the RFID tag 142, the real-time cumulative volume of lubricant being dispensed as measured by the flow meter 126 and the total required volume of lubricant to be dispensed during the event.

At step 520, the device creates and locally stores a new lubrication event on the event log and records the metadata associated with the new event, such as the unique identification number of the RFID tag 142 provided to the lubricant receiver, the unique identification number of the user operating the device 100, the time the lubricant receiver was lubricated, the volume of lubricant dispensed, the type of lubricant dispensed and the unique identification number of the device 100, which is later transferred to the remote computing device 206 as discussed above.

Whilst steps 516 to 520 are being carried out, the processing module 152 of the device 100 continues to monitor the real-time cumulative volume of lubricant being dispensed as measured by the flow meter 126, or other device, and at step 522 once the cumulative volume of lubricant being dispensed equals the total required volume of lubricant to be dispensed, the processing module 152 is configured to alert the user to stop dispensing the lubricant. The device 100 then displays to the user the next lubrication receiver on the event list at step 514. This process 500 may be then repeated for a plurality of lubrication receivers 204 as listed on the event schedule, so that the method restarts at step 506.

Figure 15:
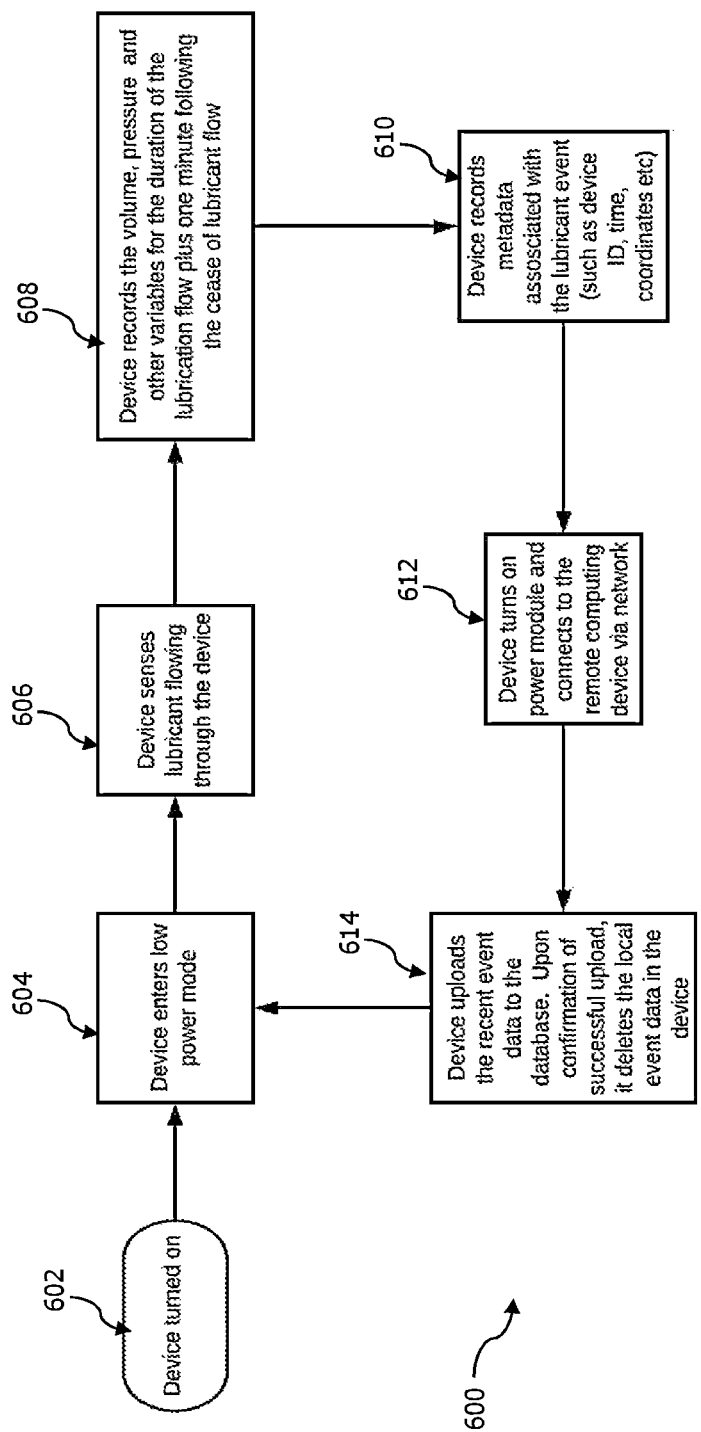
FIG. 15 is a flow chart illustrating an embodiment of the invention.

Referring to FIG. 15, another example of a method 600 for dispensing lubricant is provided. Such a method may be used for a device 100 provided to an auto-lubrication device or system. The first step 602 is that the device 100 is turned on and then enters a low power mode at 604. At step 606, the device 100 senses the presence of lubricant flowing through the device 100 and at 608 that device 100 records such information as the volume of lubricant, the pressure at which the lubricant passes through the device 100, the duration of lubricant flow. The recorded duration of lubricant flow may be adjusted to account for an additional minute to allow for the cessation of lubricant flow.

The device 100 then records the metadata associated with the lubrication event at step 610. The metadata may include the device ID, the time and coordinates. At step 612 the device 100 may turn on the power module and connect to the remote computing 202 via the network. The device 100 then uploads the recent event log data to the remote computing device 202, for example to a database. Once the device 100 successfully uploads the data to the remote computing device 202, the device 100 deletes the locally stored event log data device. Once this step has been completed, the device 100 once again enters the low power mode at 604, from where the method 600 may then repeat as necessary.

4.2 Second System

The second system 700 for dispensing lubrication will now be described with reference to FIGS. 25 and 26. The second system 700 is different from the first system 200 in that the second system 700 is intended to function as an edge computing system, which will be discussed in more detail in this section. Discussion in this section will therefore focus on how the second system 700 differs from the first system 200 so that it operates as an edge computing system.

Figure 25:
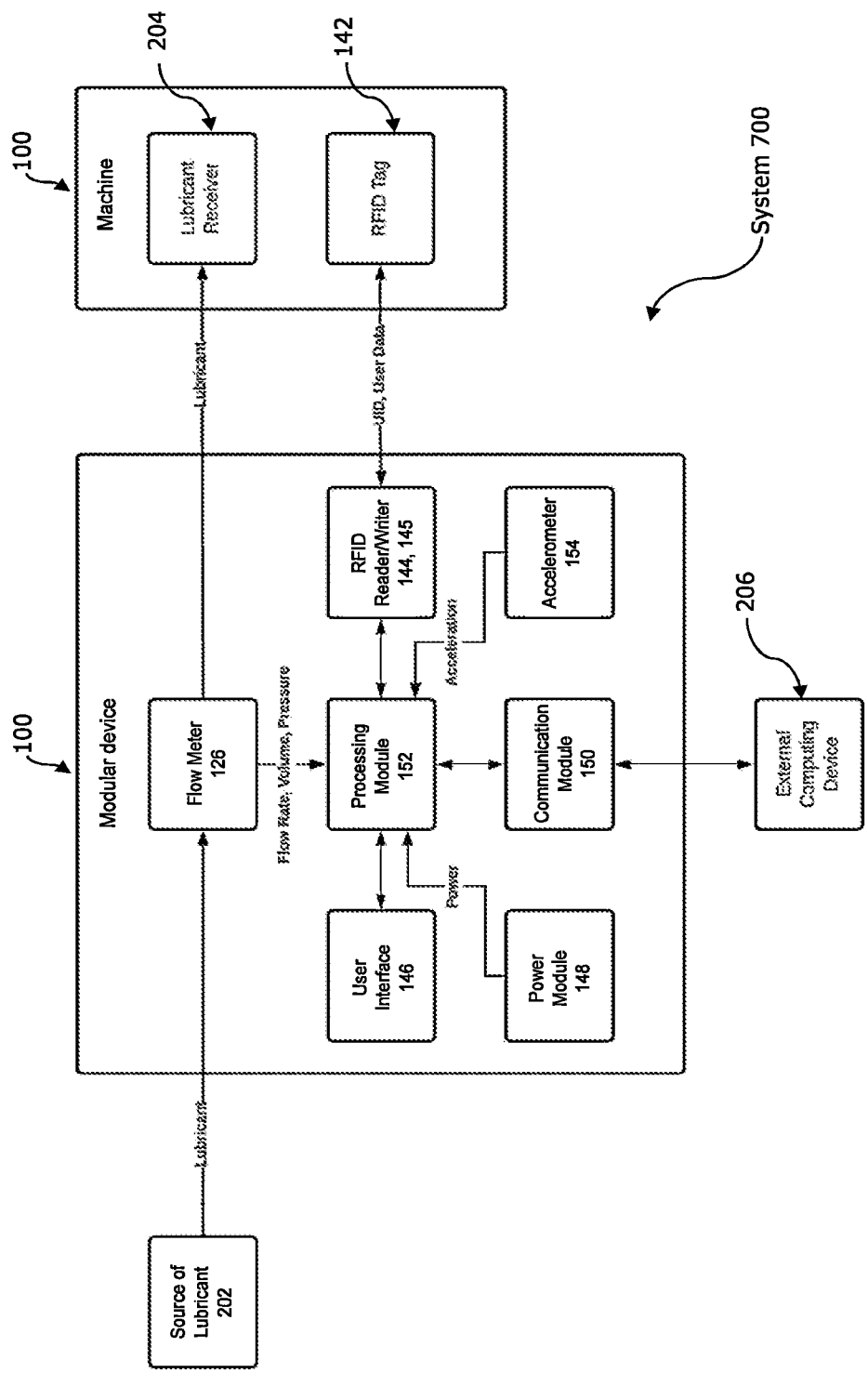
FIG. 25 is a system diagram illustrating an embodiment of the invention.

Referring to FIG. 25, there is provided a second example of a system 700 for dispensing lubrication. The second system 700 includes the device 100 connected to a source of lubrication 202 and a lubricant receiver 204 (of a machine 110). In this system, the device 100 may also be connected to a plurality of lubricant receivers, which may be provided to a single machine or provided to multiple machines.

RFID tags 142 may be provided respectively to the plurality of lubricant receivers 142. The RFID tag 142 may be attached to the lubrication receiver 142 using a fitting 160.

The device 100 in the system 700 may include some or all of the features as described above. For example, the device 100 may include the flow meter 126, RFID antenna 140, RFID reader 144, RFID writer 145, user interface module 146, power module 148 and communication module 150, and an accelerometer 154, all arranged in communication with the processing module 152. The communication module 150 can optionally be arranged in communication with the remote computing device 206. As described earlier, the RFID reader 144 and RFID writer 145 may be separate RFID devices, but can also be a common RFID device. The RFID reader 144 is for reading data from the RFID tag 142 associated with the lubricant receiver. The RFID writer 145 is for writing data to the RFID tag 142 associated with the lubricant receiver.

In a preferred embodiment, the processing module 152 receives inputs from only the RFID reader 144, the accelerometer 154, and the flow meter 126. In such an embodiment, it is unnecessary for the user interface 146 to provide any inputs to the processing module 154. For example, it is unnecessary for the user interface 146 provide any buttons or switches for the user to input.

As mentioned, the second system 700 functions as an edge computing system.

This enables lubrication to be dispensed to a lubricant receiver 204 without the provision of a centralised server, such as a remote computing device 206, event log, global event record database 412 and/or a global event schedule database 420 as described in the first system 200 with respect to FIGS. 11-15. Instead the second system 700 is configured as an edge computing system such that it operates as a de-centralised system. The configuration of the second system 700 as an edge computing system allows the device 100 of system 700 to operate independently of any network or communications. That is, the device 100 of system 700 can be operated to dispense lubrication in a remote facility where there is limited access to any network or communications. This is possible, because in the second system 700, the functions carried out by the remote computing device 206, event log global event record database 412, and global event schedule database 420 are effectively migrated to the device 100 and to the plurality of RFID tags 142 provided to their respective lubricant receivers 204 as follows.

The provision of both an RFID reader 144 and an RFID writer 145 allow the device 100 of system 700 to read and write data to RFID tags 142 provided respectively to the plurality of lubrication points. This enables the device 100 of the second system 700 to write the metadata of a lubrication event to the RFID tag 142. When the same, or different device 100 (for example in situations where there are a plurality of modular devices 100 operating in the system 700) scans the RFID tag 142 according to the second system 700, the device 100 can read the metadata of the previous lubrication event to determine whether the lubrication receiver 204 that the scanned RFID tag 142 is provided to requires lubrication. Such mechanism differs from the device 100 of the first system 200 as follows:

In the second system 700, the data stored in the RFID tag 142 provides an event record that keeps a record of previous (greasing) events for the respective lubrication receiver (that the RFID tag is provided to). The modular device 100 of the second system 700 is able to retrieve data relating to previous (greasing) events and/or relating to scheduled (greasing) events by scanning the RFID tag (using the RFID reader 144). In contrast, the first system 200 provides a global event record that keeps a record of previous greasing events for (some or) all lubrication receivers in the system 200. The modular device 100 of the first system 200 is able to retrieve data relating to previous greasing events by connecting to the remote computing device 206 as described above.

In the second system 700, the data stored on the RFID tag 142 also provides the user with an event schedule so that the user knows when the respective lubrication receiver (that the RFID tag is provided to) is scheduled for greasing. The modular device 100 of the second system 700 is able to retrieve this information by scanning the RFID tag (using the RFID reader 144). In contrast, the first system 200 provides a global event schedule of all lubrication receivers scheduled for lubrication. The modular device 100 of the first system 200 is able to retrieve data from the global event schedule by connecting to the remote computing device 206 as described above.

In the second system 700, the modular device 100 writes data relating to a (greasing) event (during or after dispensing of lubricant to the lubrication receiver) to the RFID tag (using the RFID writer 145) to update the event record stored on the RFID tag 142. In contrast, the modular device 100 of the first system 200 updates the global event record by connecting to the remote computing device 206 as described above.

The differences elaborated here allows the second system 700 to provide an alternative system that is more decentralised than the first system 200.

The event schedule can also be stored locally in the memory of the device 100 of the system 700. This allows the device 100 of system 700 to operate in an offline mode in which the device 100 of system 700 is able to log and track lubrication events without requiring connectivity to a network or communication system. Further, the device 100 of system 700 is also able to recalculate the event schedule as required, to plan for future greasing events for example. The event schedule stored locally in the memory of the device 100 of the system 700 can be accessed via a web server hosted on the device 100 of the system 700 which can perform the same functions as a remote server on the device 100. This is different from the first system 200 in which the event schedule is a global event schedule stored externally to the device 100 of the first system 200.

Figure 26:
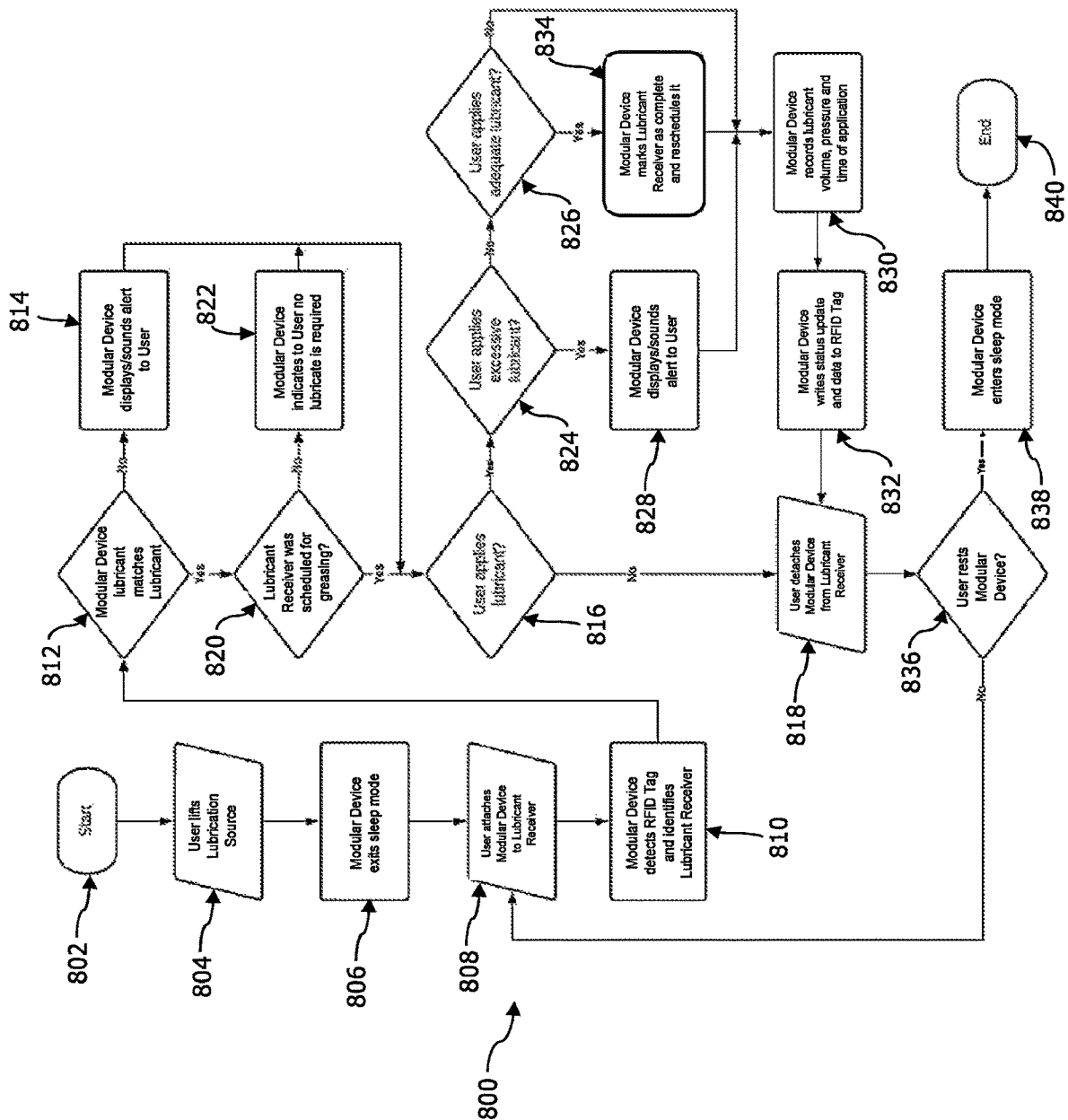
FIG. 26 is a flow chart illustrating an embodiment of the invention.

Referring to FIG. 26, an example of a method 800 for dispensing lubricant according to the system 800 is provided. For example, when the user begins greasing duties step 802, the user lifts up the lubrication source 202 and attaches the device 100 to the lubrication source 202 at step 804. This wakes up the device 100 from sleep mode at step 806.

The user then attaches the device 100 to the lubrication receiver 204 at step 808, by connecting the second coupling end 106 of the device 100 to the lubrication receiver. The act of connection places the RFID reader 144 of the device 100 is in proximity to the RFID tag 142 provided to the lubrication receiver 204, which allows the RFID reader 144 to identify the RFID tag at step 810.

At step 812, the processing module 152 of the device 100 compares the unique identification number of the lubrication receiver read from the RFID tag 142 against the event schedule (received from the RFID tag and optionally stored locally in the memory of the device 100) to determine whether the lubricant type required by the lubrication receiver 204 matches the lubricant type provided by the source of lubricant 202. The purpose of step 812 is to check the lubricant receiver 204 connected to the device 100 is being lubricated with the correct type of lubricant.

If at step 812 it is determined by the processing module 152 that the lubricant types do not match, the device 100 prompts the user interface 146 to display or sound an alert to the user at step 814. This provides a signal to the user to not dispense lubricant at step 816, and instead to detach the device 100 from the lubricant receiver 204 at step 818. In the situation that the lubricant types do not match, the lubricant receiver 204 that the device 100 is connected to, and subsequently detached from, should desirably, at a future point in time, receive lubrication from a different device 100 carrying the correct type of lubricant.

If at step 812 it is determined by the processing module 152 that the lubricant types do match, the device 100 proceeds to step 820, where the processing module 152 of the device 100 determines from the event schedule (received from the RFID tag and optionally stored locally in the memory of the device 100) whether the identified lubricant receiver 204 was scheduled for greasing. The determination can be made by the device 100 performing a comparison between the current time and the time the lubrication receiver is scheduled for greasing according to the event schedule.

If at step 820 it is determined by the processing module 152 that the identified lubricant receiver 204 was not scheduled for greasing, the device 100 prompts the user interface 146 at step 822 to indicate to the user that lubrication is not required for the identified lubrication receiver 204, which prompts the user to not dispense the lubricant at step 816, and instead detach the device 100 from the lubricant receiver 204 at step 818.

If at step 820 it is determined by the processing module 152 that the identified lubricant receiver 204 was scheduled for greasing, the user proceeds to step 816 and operates the device 100 to dispense lubrication.

While lubricant is being dispensed by the user operated device 100, the device 100 continues to monitor the real-time cumulative volume of lubricant being dispensed as measured by the flow meter 126, or other device, at steps 824 and 826.

If at step 824 it is determined by the processing module 152 that the cumulative volume of lubricant dispensed exceeds the volume prescribed by the event schedule (received from the RFID tag and optionally stored locally in the memory of the device 100), the processing module 152 on device 100 prompts the user interface 146 to display or sound an alert to the user at step 828 that an excess amount of lubrication has been dispensed to the lubrication receiver 204. The device 100 then proceeds to step 830 and updates the event record stored locally in the memory of the device 100 by recording cumulative volume of dispensed lubricant, pressure, and time of application corresponding. The device 100 then proceeds to step 832 and uses the RFID writer 145 to write the status update and data to the RFID tag 142. The user then detaches the device 100 from the lubricant receiver 204 at step 818.

If at step 824 it is determined by the processing module 152 that the cumulative volume of lubricant dispensed does not exceed the volume prescribed by the event schedule (received from the RFID tag and optionally stored locally in the memory of the device 100), the device 100 proceeds to step 826.

If at step 826 the processing module 152 determines the cumulative volume of lubricant dispensed is adequate, the device 100 proceeds at step 834 to update the event record stored locally in the memory of the device 100, by marking the lubricant receiver 204 connected to the device 100 as complete and rescheduling lubrication for a future date by updating the event schedule (received from the RFID tag and optionally stored locally in the memory of the device 100). The device 100 then proceeds to step 830, updating the event record stored locally in the memory of the device 100 by recording cumulative volume of dispensed lubricant, pressure, and time of application corresponding. The device 100 then proceeds to step 832 and uses the RFID writer 145 to write the status update and data to the RFID tag 142. The user then detaches the device 100 from the lubricant receiver 204 at step 818.

If at step 826 the processing module 152 does not determine the cumulative volume of lubricant dispensed is adequate, the device 100 proceeds to steps 830 and 832 as described, and the user detaches the device 100 from the lubricant receiver 204 at step 818.

Once the user detaches the device 100 from the lubricant receiver 204 at step 818, the user at step 836 can proceed to find another lubricant receiver 204 to dispense lubrication, and by repeating steps 808 to 834 as described above. Alternatively, at step 836, if the user is finished, the user can place the device 100 into sleep mode at step 838 to power down the device 100. At this point, the user is finished with greasing duties, step 840.

It should be noted, that the order of the method steps discussed above is merely an example of how the method can be applied. The order discussed by way of example with reference to FIG. 26 is not intended to be limiting, and in some embodiments, the order in which the method steps are administered can deviate. For example, the order of steps 812 and 820 can be reversed such that the device 100 first determines at step 820 whether the connected lubrication receiver 204 is scheduled for lubrication before proceeding to step 812 to check the lubrication receiver 204 is being administered with the correct lubricant type.

While the system 700 can provide a system for dispensing lubricant without needing further modifications from what has already been described, this system 700 may additionally include some of, or all of the features and functions as described in the first system 200. For example, the system 700 may optionally include a device 100 comprising a communication module 150 arranged in communication with a remote computing device 206 with some of, or all of the features and functions as described above with respect to FIGS. 11-15 (see the first system section) so that it can perform any aspects of methods 300, 400, 500, and/or 600.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "top" and "end", "rear" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

5. Advantages

The above described embodiments provide a module system that advantageously is able to be connected between any machine requiring lubrication and any type of lubricator. For example, the first aspect is able to be connected to a grease gun and the second aspect is able to be connected to an auto-lubrication device or system. This also results in the ability for the device as described to be retrofitted into existing machining or plants and allow for use of existing lubrication equipment without modification. Further, the system may also provide installation and use within autonomous platforms.

Further, the above embodiment also provide a lubrication verification system, particularly for auto-lubrication systems or for lubrication tasks with obscured access. This is due to the flow meter measuring the flow of lubricant at the grease point instead of being monitored from a central pump, which is susceptible to fixture failure and hose leakage.

Additionally, for basic mechanically driven auto-lubrication systems, the embodiments provides verification that the correct amount of lubrication is being applied at the correct time.

Moreover, the embodiments of the above device as described enables users to use any type of grease gun, auto-lubrication device or system or indeed any type of supply of lubricant and not be limited to a specific manufacturer.

The embodiments described also provide an automated reporting to relevant personnel on completeness of lubrication tasks. For example, the remote computer may be configured to send a daily email to maintenance manager indicating which machines have been greased for that day, and which of the machines were not greased so that they are now behind schedule.

Further, the embodiment described also provide an effective means of collecting data, especially in hazardous areas where automated data collection is limited. For example, the device can collect additional data such as grease pressure to be used for machine performance/failure analysis purposes. Further the remote computing device may be able to use such data to predict equipment failure or adapt greasing requirements. Further, the complete collection of a historical record of greasing events for every nipple in the plant can be utilised for original equipment manufacturer warranty claims to prove correct maintenance or to hold responsible parties accountable to maintenance tasks.

Moreover, the above embodiments guarantee the right type and volume of grease is used. For example, the device will only direct operators to grease nipples that require the grease type that is used in that device.

Moreover, as discussed, the fitting for attaching an RFID tag to a lubrication receiver provides an easy option for attaching the RFID tag to the lubrication receiver, preferably an easy snap-fit option. This provides one or more of the following advantages:

The clipping mechanism as described allows the RFID tag to be attached to the lubrication receiver without needing to dismantle the lubrication receiver first. Without the fitting, the lubrication receiver would need to first be removed before the RFID tag can be installed on the lubrication receiver.

The clipping mechanism as described also allows the RFID tag to be attached to the lubrication receiver without using any tools for installation.

The fitting as described therefore makes RFID tag installation onto the lubrication receiver faster and/or less labour intensive.

Further, the embodiments of the systems 200 and 700 as described above provides a reliable and accurate tracking/monitoring system to ensure lubrication receivers are correctly being greased according to the event schedule (either on the global event schedule and/or on the event schedule stored locally on the RFID tags). Some of the benefits provided are listed as follows:

The lubrication receivers are being properly greased with the right lubricant and at the right time.

Multiple modular devices 100 can operate in unison (by multiple users) at a site Further, with the second system 200, the first two benefits listed above can be realised, even in instances where greasing takes place on an isolated/remote site where there is little or no connectivity to an external (telecommunications) network, due to the decentralised and/or edge computing network nature of the second system 200.

The invention claimed is:

1. A modular device for dispensing a lubricant, comprising:
a first coupling end attachable to a source of lubrication;
a second coupling end attachable to a lubrication receiver;
a control module arranged between the first coupling end and the second coupling end, the control module including a flow measuring device in fluid communication between the first end coupling and the second end coupling, wherein the control module is configured to:
determine from a received event schedule whether the lubrication receiver is scheduled for lubrication, and enable dispensing of the lubricant.

2. The modular device in accordance with claim 1, wherein the flow measuring device includes a means to measure pressure of the lubrication dispensed.

3. The modular device in accordance with claim 1, wherein the control module further includes a processing module with at least one source of memory, the processing module arranged in communication with the flow measuring device, the processing module further arranged in communication with a communication module configured to transmit data between the processing module and a remote computing device.

4. The modular device in accordance with claim 3, wherein the control module further includes a Radio Frequency Identification (RFID) reader device in communication with the processing module.

5. The modular device in accordance with claim 4, wherein the second end coupling includes a RFID antenna arranged in communication with the RFID reader device.

6. The modular device in accordance with claim 5, wherein the RFID antenna is configured to read RFID tag data stored on a RFID tag located at or proximate to the lubrication receiver when the second end coupling is attached or proximate to the location of the lubrication receiver.

7. The modular device in accordance with claim 6, wherein the modular device receives the event schedule relating to a plurality of lubrication receivers from the remote computing device via the communication module and stores the data set on the processing module.

8. The modular device in accordance with claim 7, wherein the processing module compares the RFID tag data to the event schedule to determine whether any of the plurality of lubrication receivers requires lubrication.

9. The modular device in accordance with claim 8, wherein for any of the plurality of lubrication receivers that is determined as requiring lubrication, the processing module uses the measurements from the flow measuring device to determine when a correct lubrication amount has been provided to the lubrication receiver.

10. The modular device in accordance with claim 9, wherein the processing module indicates to a user via a user interface to stop dispensing lubricant when the correct lubrication amount has been provided to the lubrication receiver.

11. The modular device in accordance with claim 10, wherein the processing module stores new event data for each of any of the plurality of lubrication receivers that has been lubricated.

12. The modular device in accordance with claim 7, wherein the device is configured to determine whether the lubrication receiver is scheduled for greasing based on a comparison between current time and time the lubrication receiver is scheduled for lubrication according to the received event schedule.

13. The modular device in accordance with claim 12, wherein the device is configured to provide an indication that lubrication should be dispensed to the lubrication receiver corresponding to a scanned RFID tag if the device determines the lubrication receiver is scheduled for lubrication.

14. The modular device in accordance with claim 1, wherein the control module includes at least one Radio Frequency Identification (RFID) device configured to read RFID tag data from an RFID tag and/or write RFID tag data to an RFID tag.

15. The modular device in accordance with claim 14, wherein the RFID tag data includes; a unique identification number assigned to the lubrication receiver.

16. A system for dispensing a lubricant, the system comprising:
a plurality of modular devices according to claim 1;
wherein each modular device is configured to guide a respective user to lubricate one or more lubrication receivers in accordance with an updated event schedule.

17. A system in accordance with claim 16, wherein the updated event schedule is provided by configuring the plurality of modular devices to write event data to an RFID tag corresponding to the lubrication receiver, with an RFID writer.

18. A system in accordance with claim 17, wherein the event data comprises one or more of:
time of lubrication event;
date of lubrication event;
volume of lubricant dispensed; or
identifying information of the source of lubrication.

19. A system in accordance with claim 16, wherein the plurality of modular devices are configured to receive an updated event schedule by:
connecting to a remote computing device to retrieve a global event schedule, and/or
scanning an RFID tag corresponding to the lubrication receiver, preferably with an RFID reader, to retrieve event data previously saved to the RFID tag.

20. A method for dispensing lubricant; comprising:
attaching a first coupling end of a modular lubrication dispensing device to a source of lubrication, the device including a control module and a user interface;
attaching a second coupling end of the device to at least one lubrication receiver;
transmitting an event schedule to the device;
identifying the at least one lubrication receiver by means of a Radio Frequency Identification (RFID) reading device provided to the second coupling end that reads identification data from a RFID tag device provided to the at least one lubrication receiver;
indicating to a user by means of the user interface whether the at least one lubrication receiver requires lubrication in accordance with the event schedule received by the device,
wherein if the at least one lubrication receiver requires lubrication;
dispensing lubricant to the at least one lubrication receiver;
measuring a flow of lubrication to the at least one lubrication receiver using a flow measuring device arranged between the first coupling end and the second coupling end;
alerting a user of the device that an appropriate amount of lubrication has been dispensed.

* * * * *